US012748237B2

(12) United States Patent
Olsson et al.

(10) Patent No.: US 12,748,237 B2
(45) Date of Patent: Sep. 29, 2026

(54) SMARTPHONE MOUNTING APPARATUS AND IMAGING METHODS FOR ASSET TAGGING AND UTILITY MAPPING AS USED WITH UTILITY LOCATOR DEVICES

(71) Applicant: SeeScan, Inc., San Diego, CA (US)

(72) Inventors: Mark S. Olsson, La Jolla, CA (US); Ryan B. Levin, San Diego, CA (US); Alexander L. Warren, Escondido, CA (US); Garrett A. Newby, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 205 days.

(21) Appl. No.: 18/774,758

(22) Filed: Jul. 16, 2024

(65) Prior Publication Data

US 2025/0028073 A1 Jan. 23, 2025

Related U.S. Application Data

(60) Provisional application No. 63/514,090, filed on Jul. 17, 2023.

(51) Int. Cl.

*F16M 11/00* (2006.01)
*G01V 11/00* (2006.01)

(Continued)

(52) U.S. Cl.

CPC .......... *G01V 11/002* (2013.01); *G06F 1/1632* (2013.01); *H04M 1/04* (2013.01); *H04N 23/69* (2023.01); *H04M 2250/52* (2013.01)

(58) Field of Classification Search

CPC .... G01V 11/002; G01V 3/165; G06F 1/1632; H04M 1/04; H04M 2250/52; H04N 23/69;

(Continued)

(56) References Cited

U.S. PATENT DOCUMENTS 9,465,129 B1 10/2016 Olsson et al.
10,105,723 B1 10/2018 Olsson et al.

(Continued)

FOREIGN PATENT DOCUMENTS

WO 2015116993 A1 8/2015
WO 2018035396 A1 3/2017

(Continued)

OTHER PUBLICATIONS

International Searching Authority, "Written Opinion of the International Searching Authority" for PCT Patent Application No. PCT/US24/038244, Jul. 16, 2024, Feb. 25, 2025, European Patent Office, Munich.

*Primary Examiner* — Amy J. Sterling

(74) *Attorney, Agent, or Firm* — Steven C. Tietsworth, Esq.; Michael J. Pennington, Esq.

(57) ABSTRACT

Methods for mapping utility lines and identifying and tagging assets relating to utility lines as well as a smartphone mounting apparatus are disclosed. The smartphone mounting apparatus may couple to a utility locator device in a known position and orientation for use in tagging assets in a utility locating operation. Such assets along the ground surface may be captured by the camera(s) of the smartphone and/or cameras of the utility locator device and the resulting still images and/or video may be correlated with geolocation data of the tagged asset. Further, methods using Deep Learning/artificial intelligence are included to recognize patterns and make predictions related to underground utilities including utility line type classification.

15 Claims, 21 Drawing Sheets

(51) Int. Cl.

| | |
|---|---|
| ***G06F 1/16*** | (2006.01) |
| ***H04M 1/04*** | (2006.01) |
| ***H04N 23/69*** | (2023.01) |

(58) Field of Classification Search

CPC ...... H04N 23/57; F16M 11/041; F16M 11/10; F16M 11/105; F16M 13/00; F16M 13/02; G01S 17/88; G01S 17/86; G03B 17/561

See application file for complete search history.

(56) References Cited

U.S. PATENT DOCUMENTS

| | | | | |
|---|---|---|---|---|
| 10,353,103 | B1 * | 7/2019 | Olsson | F16M 11/34 |
| 12,618,508 | B2 * | 5/2026 | Liu | F16H 19/04 |
| 12,623,612 | B2 * | 5/2026 | Iverson | B60R 11/0241 |
| 12,659,394 | B2 * | 6/2026 | McCoy | H04M 1/04 |
| 2005/0046584 | A1 | 3/2005 | Breed | |

FOREIGN PATENT DOCUMENTS

| | | | |
|---|---|---|---|
| WO | 2022271708 | A1 | 12/2022 |
| WO | 2024137509 | A1 | 6/2024 |

* cited by examiner

SMARTPHONE MOUNTING APPARATUS AND IMAGING METHODS FOR ASSET TAGGING AND UTILITY MAPPING AS USED WITH UTILITY LOCATOR DEVICES

CROSS-REFERENCE TO RELATES APPLICATIONS

This application claims priority under 35 U.S.C. § 119(e) to U.S. Provisional Patent Application Ser. No. 63/514,090, entitled SMARTPHONE MOUNTING APPARATUS AND METHODS FOR ASSET TAGGING AS USED WITH UTILITY LOCATOR DEVICES, filed Jul. 17, 2023, the content of which is incorporated by reference herein in its entirety for all purposes.

FIELD

This disclosure relates generally to methods for mapping utility lines and associated apparatus for mounting a smartphone on a utility locator device. More specifically, this disclosure relates to image processing and utility mapping methods via a smartphone optionally mounted on a utility locator device via for a smartphone mapping apparatus as well as methods using Deep Learning/artificial intelligence to recognize patterns and make predictions related to underground utilities including utility line type classification.

BACKGROUND

Utility locator devices, sometimes referred to as Geo-Locating Receivers (GLR), are used to locate utility lines buried or otherwise hidden from sight are well known in the art. The vast majority of utility locator devices known in the art may measure electromagnetic signals at one or a limited few frequencies from current coupled to an electrically conductive utility line via a transmitter device or from AC current inherently flowing through the utility such as with a power line. Known utility locator devices may be tuned to one or a limited few frequencies emitted by a utility line which may further be located via tracing the length of the utility line along the ground surface in a procedure commonly referred to as "line tracing." Such devices are extremely limited in the information collected regarding buried utility lines and the environment in which they exist. For instance, such utility locator devices are limited to locating only those utility lines which have knowingly had current coupled thereto thus leaving a user ignorant of presence other unknown utility lines. Further, such utility locator devices provide little to no information regarding the locate environment that may have influence on the electromagnetic data and/or may otherwise provide information that be helpfully in precisely locating or mapping all buried utility lines.

There are few utility locator devices known in the art configured to measure electromagnetic signals across a large range of frequencies. Such utility locator devices may, in addition to the vast amounts of electromagnetic signal data, collect other data relating to the locating environment to facilitate precisely locating and mapping buried utility lines. For instance, such utility locator devices known in the art may determine geolocations via GNSS receivers and other INS sensor data. Further, some such utility locator devices may "tag" or determine and record the geolocation of assets in the locate environment that may be related to the buried utility lines, influence the measured electromagnetic signals, associating utility positions to maps of the same area, and/or have other significance to locating buried utility line. Whereas having this additional information is useful in precisely locating and mapping utility lines, the vastness of such data may be challenging to process in or near real-time.

Some more advanced utility locator devices may be part of a broader system wherein processing of data and/or measuring or collecting of other information may be accomplished by other connected devices (e.g., laptops, tablets, smartphones, remote servers, signal transmitters, base stations, other locating specific devices and the like) thus alleviating the burden of the utility locator device. As utility locator device continue to evolve and the need to include other devices in a larger locating system becomes desirable or necessary, there is a need to accommodate other connected devices in ways to facilitate ease of use as well as improve upon the functionality of such connected devices when used in conjunction with a utility locator device.

Further, ensuring that utility lines are accurately located and/or mapped is imperative for the protection of humans and infrastructure. Every year incorrectly or inaccurately located and mapped utility lines results in tragedy wherein excavation may mistakenly strike utility lines (e.g., explosions from damaged gas pipes, electrocutions and fires from damaged power lines, floods from damaged water lines, and the like). As a result, there is a vast financial cost from damage to nearby buildings and other infrastructure as well as injury and even death to workers and other people in the surrounding area. Known utility locating devices and systems may utilize GPS or other GNSS to determine and map the geolocations of electromagnetic signals. As there is often error in geolocations produced via GPS or other GNSS, mapped utility lines may not be as accurate as desired. Such errors may be further increased wherein teams excavating the utility line or lines again utilize GPS or other GNSS attempt to determine the location to dig to unearth the same utility lines. Likewise, there is a wealth of data present in the locate environment that is ignored by known devices and systems that may otherwise allow for more precise mapping of utility lines which, in turn, could result in more accurate and safe excavations of utility lines. The term "assets" or "ground assets," as used herein, may be used to refer to such data present in the locate environment that may generally be along the ground surface.

Furthermore, known utility locator devices and systems fail to provide information regarding utility lines that may be useful to a user. For instance, various characteristics of a utility line, such as a utility line type (e.g., water, sewer, power, gas, telecommunication, and the like), may be useful information to a user for purposes of locating, mapping, or excavating a particular utility line.

Accordingly, there is a need in the art to address the above-described as well as other problems.

SUMMARY

The present disclosure relates generally to methods for mapping utility lines and associated apparatus for mounting a smartphone on a utility locator device. More specifically, this disclosure relates to image processing and utility mapping methods via a smartphone optionally mounted on a utility locator device via for a smartphone mapping apparatus as well as methods using Deep Learning/artificial intelligence to recognize patterns and make predictions related to underground utilities including utility line type classification.

In accordance with one aspect of the present invention a smartphone mounting apparatus for coupling a smartphone to a utility locator device and related methods are disclosed. The smartphone mounting apparatus having a retainer element to mount and selectively retain a smartphone such that the camera(s) of the smartphone remain unobstructed and may approximately align with the median plane of the utility locator device and an angle joint element to orient the smartphone in the retainer element at a known angle such that the camera(s) of the smartphone has a field of view capturing still and video images of an asset to be tagged at the ground surface in front of the utility locator device during normal usage. Further, the smartphone mounting apparatus having a mounting element to secure the smartphone mounting apparatus to the utility locator device.

In accordance with another aspect of the invention, an asset tagging method that employees a smartphone retained in a smartphone mounting apparatus is disclosed. The method includes a step mounting a smartphone in a smartphone mounting apparatus coupled in a known position and orientation on a utility locator device. In another step, the method includes performing a utility locating operation via the utility locator device. In another step, the method includes identifying assets to be tagged. In another step, the method includes actuating asset tagging generating asset tagging data that includes the geolocation of the asset. In another step, the method includes capturing video and/or still images of the asset on the smartphone. In another step, the method includes communicating the video and/or still images of the asset to the utility locator device. In another step, the method includes correlating the video and/or still images of the asset with asset tagging data.

In accordance with another aspect of the invention, a locate environment scanning method employing a smartphone mounting apparatus is disclosed. In one step, the method includes mounting a smartphone in a smartphone mounting apparatus secured in a known position and orientation on a utility locator device. In another step, the method includes performing a utility locating operation with the utility locator device. In another step, the method includes generating images via the camera(s) of the smartphone at a known interval. In another step, the method includes associating each image with a geolocation of the image determined via the smartphone or utility locator device. In another step, the method includes storing, via one or more non-transitory memories, images and associated geolocations.

In accordance with another aspect of the invention, the method may include analyzing images in real-time for features of interest, and capturing images based on feature recognition.

In accordance with another aspect of the invention, a utility mapping method is disclosed. The method includes moving about a locate environment measuring electromagnetic signals via a utility locator device generating electromagnetic signal data. The utility locator device and/or a smartphone which may be disposed in a smartphone mounting apparatus may generate images of the locate environment at a known position relative to the utility locator device as well as geospatial data describing the pose/orientations and geolocations of the utility locator device in a world coordinate system. The method further includes mapping electromagnetic signal data based on the geospatial data of the utility locator device. The method includes identifying objects or other assets in the images that correlate or match those in a pre-existing digital map. The method further determines an offset value describing the distance and direction between the geolocations of objects/assets in the images of the locate environment and the geolocations of the objects/assets in the pre-existing digital map. The method further applies the offset values in both distance and direction to mapped electromagnetic signal data to generate an updated utility map. The method includes storing electromagnetic signal data, geospatial data, images of the locate environment, identified object/assets, offset values, and updated utility maps in one or more non-transitory memories.

In accordance with another aspect of the invention, a computer implemented method for utility line positions and characteristics including utility line type classification using Artificial Intelligence (AI) is disclosed. The method includes collecting Locating Data describing the positions of utility lines in the ground from electromagnetic signals via a utility locator device and Asset Data describing mapping and other data determined from images of the ground surface. The method further includes assembling a Training Database that includes Locating Data and Asset Data. Using deep learning to train a Neural Network (Artificial Intelligence/AI) via the Training Database Data. The method includes using AI to generate predictions regarding the positions of utility lines and utility line characteristics. The predictions may include utility line type classification. For instance, relationships between electromagnetic signal patterns and utility line types. The method includes outputting predictions regarding the positions of utility lines and utility line characteristics.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
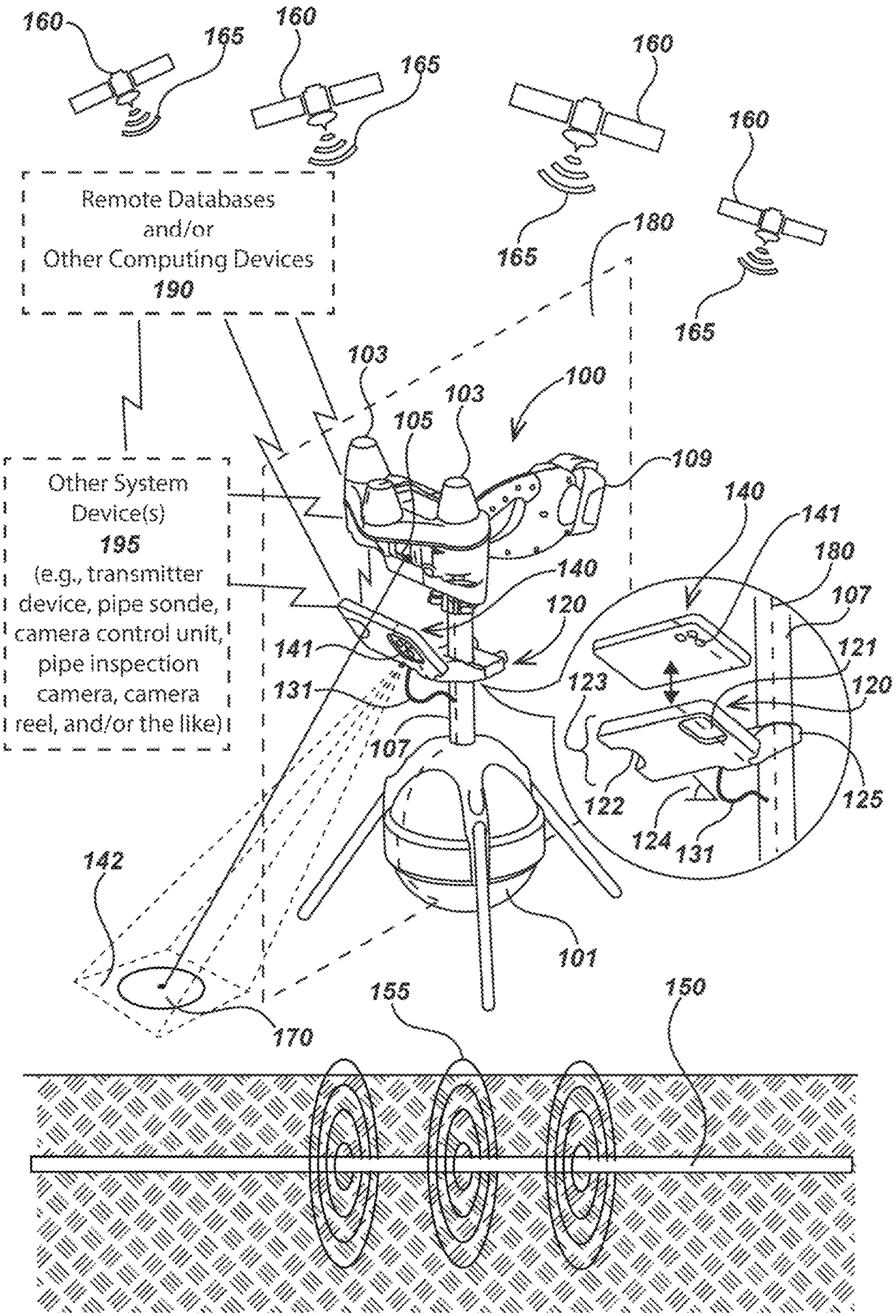
FIG. 1A is an illustration of a utility locator device and a smartphone mounting apparatus retaining a smartphone for tagging an asset in a locate operation.

The present disclosure relates generally to methods for mapping utility lines and associated apparatus for mounting a smartphone on a utility locator device. More specifically, this disclosure relates to image processing and utility mapping methods via a smartphone optionally mounted on a utility locator device via for a smartphone mapping apparatus as well as methods using Deep Learning/artificial intelligence to recognize patterns and make predictions related to underground utilities including utility line type classification.

In accordance with one aspect of the present invention a smartphone mounting apparatus for coupling a smartphone to a utility locator device is disclosed. The smartphone mounting apparatus having a retainer element to mount and selectively retain a smartphone such that the camera(s) of the smartphone remain unobstructed and may align with the median plane of the utility locator device. In some embodiments the camera or cameras may be or include LiDAR or other three-dimensional imaging apparatus to generate a three-dimensional image of an asset or three-dimensional position of features of interest, e.g. a street corner, road, etc. LiDAR may also be used to measure the distance to various points within an image. In some embodiments, images may be scanned for features in real-time, and the scanned features may be used for navigation. Optionally, all navigational features and sensors, as well as computational capabilities of the phone, should be available to be combined with locator sensors to improve navigational results.

The retainer element may, in some embodiments, be adjustable to accommodate different sized and shaped smartphones. The smartphone mounting apparatus further including an angle joint element to orient the smartphone in the retainer element at a known angle such that the camera(s) of the smartphone has a field of view capturing still and video images of an asset to be tagged at the ground surface in front of the utility locator device during normal usage. In some embodiments, the angle joint element may be adjustable to adjust the angle of the field of view for capturing still and video images of an asset to be tagged at the ground surface. Further, the smartphone mounting apparatus having a mounting element to secure the smartphone mounting apparatus to the utility locator device. In some embodiments, the mounting element may couple to the mast of the utility locator device. In further embodiments, the mounting element may couple to the head of the utility locator device. In some embodiments, the mounting element may be positioned on the utility locator device such that the user interface of an attached smartphone may be accessible by the user in control of the utility locator device.

In another aspect, the smartphone mounting apparatus embodiments of the present invention may include a wired connector for connecting the smartphone and utility locator device for the purpose of exchanging data and/or providing electrical power to the smartphone. In some such embodiments, a smartphone mounting apparatus may include a wireless charging mechanism for the purpose of providing electrical power to the smartphone. In further embodiments, a smartphone mounting apparatus of the present invention may include a battery in providing electrical power to the smartphone. In some embodiments, the smartphone may be charged when installed into the mount if a charge battery is present in the locator. Phone charging may be configured to charge the phone even if the locator is turned off.

In accordance with another aspect, the utility locator devices, smartphones, other system devices, and/or remote databases (e.g., cloud servers or the like) may be in wireless communication with each other. Further, the methods disclosed herein may include communicating data and images to one or more other devices for processing. For instance, in some embodiments, images may be generated via one or more cameras in the utility locator device and be communicated to a smartphone for processing. In such embodiments, the smartphone may receive images, electromagnetic data, geospatial data, and/or other data and tag asset, identify assets present in the locate environment and determine utility line type, determine utility line types, mapping of electromagnetic signals and utility lines, and other processing/analysis. It should be noted that in such embodiments that a smartphone may or may not be held in smartphone mounting apparatus of the present disclosure.

In another aspect, the specific optical characteristics of the smartphone may be communicated to the utility locator device. In some such embodiments, the specific optical characteristics may be included in correcting the geolocation of assets and utility lines.

In accordance with another aspect of the invention, an asset tagging method that employees a smartphone retained in a smartphone mounting apparatus is disclosed. The method includes a step mounting a smartphone in a smartphone mounting apparatus coupled in a known position and orientation on a utility locator device. In another step, the method includes performing a utility locating operation via the utility locator device. In another step, the method includes identifying assets to be tagged. In some instances, the tagging process may be voice activated. In another step, the method includes actuating asset tagging generating asset tagging data that includes the geolocation of the asset. For instance, the asset may be tagged via a laser rangefinder apparatus. In such embodiments, the orientation of the smartphone mounting apparatus may capture the laser on the asset in the field of view of the smartphone when installed. In another step, the method includes capturing video and/or still images of the asset on the smartphone. In another step, the method includes communicating the video and/or still images of the asset to the utility locator device. In another step, the method includes correlating the video and/or still images of the asset with asset tagging data. The position of the laser dot in the phone camera image may correspond to a distance due to using parallax due to the offset of the phone with respect to the laser.

In another aspect, the video and/or still images of the asset and corresponding asset tagging data may be communicated to a remote database and/or other remote device. For instance, the video and/or still images of the asset and corresponding asset tagging data may be communicated to a cloud computer and/or other computing device and/or other system device(s).

In another aspect, the correlated video and/or still images of the asset and the asset tagging data may further be correlated with electromagnetic signal data and associated utility line positions. Further, the correlated video and/or still images of the asset and the asset tagging data may further be correlated with notes or other user input. The term "correlate" as used herein may refer to an association or relationship between data/information or other aspects of the utility locating and/or asset tagging operations. Likewise, the terms "correlating" and "correlated" may refer to identifying or establishing a link or relationship between information/data or other aspects of the utility locating and/or asset tagging operations. Such correlations may spatially align or otherwise have a spatial relationship. For instance, electromagnetic data may have a correlating spatial relationship with tagged assets or other images of the locating environment. In other embodiments, such correlations may refer to relationships between data or sets of data. For instance, in some embodiments, such as the method 1100 of FIG. 11 or the AI method 1300 of FIG. 13, a correlation may be identified between utility line types as determined through images of the locate environment and the patterns in electromagnetic signals.

In accordance with another aspect of the invention, a locate environment scanning method employing a smartphone mounting apparatus is disclosed. In one step, the method includes mounting a smartphone in a smartphone mounting apparatus secured in a known position and orientation on a utility locator device. In another step, the method includes performing a utility locating operation with the utility locator device. In another step, the method includes generating images via the camera(s) of the smartphone at a known interval. For instance, the interval may be based on timing or in change of position/geolocation. In an optional step, assets may be identified from the images. In some embodiments, the images may be three-dimensional (e.g., via LiDAR or other three-dimensional imaging system). In another step, the method includes associating each image with a geolocation of the image determined via the smartphone or utility locator device. Optionally, the method may include generating a map of the locate environment from the images and associated geolocations. Such a map may include the positions/geolocations of utility lines. In some embodiments, three-dimensional images may be used to generate a topographical map of the locate environment that may include utility line positions/geolocations. In another step, the method includes storing, via one or more non-transitory memories, images and associated geolocations.

In accordance with another aspect of the invention, a utility mapping method is disclosed. The method includes moving about a locate environment measuring electromagnetic signals via a utility locator device generating electromagnetic signal data. The utility locator device and/or a smartphone which may be disposed in a smartphone mounting apparatus may generate images of the locate environment at a known position relative to the utility locator device as well as geospatial data describing the pose/orientations and geolocations of the utility locator device in a world coordinate system. It should be noted that the images may be generated via cameras disposed in the utility locator device and/or cameras disposed in a smartphone which may be in a smartphone mounting apparatus. In at least one embodiment, images may be generated via cameras in the utility locator device and further communicated to a smartphone (which may or may not be in a smartphone mounting apparatus) for processing of images and other data. Likewise, such images and data may be communicated to a remote database (e.g., cloud server or the like) and/or other system devices (e.g., transmitter device, base station, camera control unit, pipe inspection camera, camera reel, and/or the like). Optionally, the method may include orthorectifying images of the locate environment. The orthorectification of images may occur in real-time or near real-time. The method further includes mapping electromagnetic signal data based on the geospatial data of the utility locator device. The method includes identifying objects or other assets in the images that correlate or match those in a pre-existing digital map. The method further determines an offset value describing the distance and direction between the geolocations of objects/assets in the images of the locate environment and the geolocations of the objects/assets in the pre-existing digital map. The method further applies the offset values in both distance and direction to mapped electromagnetic signal data to generate an updated utility map. Optionally, the method may include classifying utility lines with a utility type (e.g., gas, water, sewer, power, telecommunications, and the like). Further, the method may optionally include associating or correlating utility line type with the electromagnetic signal patterns of the prior step. The method includes storing electromagnetic signal data, geospatial data, images of the locate environment, identified object/assets, offset values, utility classifications and associated electromagnetic signal pattern data, and updated utility maps in one or more non-transitory memories.

In accordance with another aspect of the invention, a computer implemented method for utility line positions and characteristics including utility line type classification using Artificial Intelligence (AI) is disclosed. The method includes collecting Locating Data describing the positions of utility lines in the ground from electromagnetic signals via a utility locator device and Asset Data describing mapping and other data determined from images of the ground surface. The Locating Data may, for example, include electromagnetic data measured via the utility locator device, geospatial data describing geolocations and orientations/pose, depth estimates of utility lines, maps of utility lines, user input data, and other data relating to the location/position and characteristics of utility lines. The Asset Data may, for example, include asset tagging data, images of the locate environment, utility line classification data (e.g., data relating utility line type with images of assets and data relating determined utility line type with electromagnetic data), offset data, user input data, and other data relating to assets or other objects in the locate environment. The method further includes assembling a Training Database that includes Locating Data and Asset Data. Using deep learning to train a Neural Network (Artificial Intelligence/AI) via the Training Database Data. The method includes using AI to generate predictions regarding the positions of utility lines and utility line characteristics. The predictions may include utility line type classification. For instance, relationships between electromagnetic signal patterns and utility line types. The method includes outputting predictions regarding the positions of utility lines and utility line characteristics.

Details of example methods and devices that may be used in or combined with the devices and methods described herein, are disclosed in co-assigned patents and patent applications including: U.S. Pat. No. 5,808,239, issued Aug. 17, 1999, entitled VIDEO PUSH-CABLE; U.S. Pat. No. 6,545,704, issued Jul. 7, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 6,862,945, issued Mar. 8, 2005, entitled CAMERA GUIDE FOR VIDEO PIPE INSPECTION SYSTEM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,289,385, issued Oct. 16, 2012, entitled PUSH-CABLE FOR PIPE INSPECTION SYSTEM; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. Pat. No. 8,587,648, issued Nov. 19, 2013, entitled SELF-LEVELING CAMERA HEAD; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PRE-AMPLIFIER AND MIXER CIRCUITRY FOR A LOCATOR ANTENNA; U.S. Pat. No. 8,908,027, issued Dec. 9, 2014, entitled ASYMMETRIC DRAG FORCE BEARING FOR USE WITH A PUSH-CABLE STORAGE DRUM;

U.S. Pat. No. 8,970,211, issued Mar. 3, 2015, entitled PIPE INSPECTION CABLE COUNTER AND OVERLAY MANAGEMENT SYSTEM; U.S. Pat. No. 8,984,698, issued Mar. 24, 2015, entitled LIGHT WEIGHT SEWER CABLE; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,081,109, issued Jul. 14, 2015, entitled GROUND-TRACKING DEVICES FOR USE WITH A MAPPING LOCATOR; U.S. Pat. No. 9,080,992, issued Jul. 14, 2015, entitled ADJUSTABLE VARIABLE RESOLUTION INSPECTION SYSTEMS AND METHODS; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,521,303, issued Dec. 13, 2016, entitled CABLE STORAGE DRUM WITH MOVABLE CCU DOCKING APPARATUS; U.S. patent application Ser. No. 15/846,102, filed Dec. 16, 2016, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2017, entitled TRACKABLE DISTANCE MEASURING DEVICES, SYSTEMS, AND METHODS; U.S. Pat. No. 9,927,368, issued Mar. 27, 2021, entitled SELF-LEVELING INSPECTION SYSTEMS AND METHODS; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States patent application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States patent application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,769,366, issued Sep. 29, 2017, entitled SELF-GROUNDING TRANSMITTER PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND-TRACKING APPARATUS, SYSTEMS, AND METHODS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 16/255,524, filed Jan. 23, 2018, entitled RECHARGEABLE BATTERY PACK ONBOARD CHARGE STATE INDICATION METHODS AND APPARATUS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 16/382,136, filed Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/443,789, filed Jun. 18, 2018, entitled MULTI-DIELECTRIC COAXIAL PUSH-CABLES AND ASSOCIATED APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. patent application Ser. No. 16/036,713, issued Jul. 16, 2018, entitled UTILITY LOCATOR APPARATUS AND SYSTEMS; U.S. Pat. No. 10,027,526, issued Jul. 17, 2018, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. Pat. No. 10,100,507, issued Oct. 16, 2018, entitled PIPE CLEARING CABLES AND APPARATUS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/810,788, filed Mar. 5, 2019, entitled MAGNETICALLY RETAINED DEVICE HANDLES; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/588,834, filed Sep. 30, 2019, entitled VIDEO INSPECTION SYSTEM WITH WIRELESS ENABLED CABLE STORAGE DRUM; U.S. Pat. No. 10,440,332, issued Oct. 8, 2019, entitled INSPECTION CAMERA DEVICES AND METHODS WITH SELECTIVELY ILLUMINATED MULTISENSOR IMAGING; U.S. patent application Ser. No. 16/676,292, filed Nov. 6, 2019, entitled ROBUST IMPEDANCE CONTROLLED SLIP RINGS; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. patent application Ser. No. 17/397,940, filed Aug. 9, 2021, entitled INSPECTION SYSTEM PUSH-CABLE GUIDE APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/013,831, filed Sep. 7, 2020, entitled MULTIFUNCTION BURIED UTILITY LOCATING CLIPS; U.S. patent application Ser. No. 17/014,646, filed Sep. 8, 2020, entitled INTEGRATED FLEX-SHAFT CAMERA SYSTEM AND HAND CONTROL; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,848,655, issued Nov. 24, 2020, entitled HEAT EXTRACTION ARCHITECTURE FOR COMPACT VIDEO CAMERA HEADS; U.S. patent application Ser. No. 17/110,273, filed Dec. 2, 2020, entitled INTEGRAL DUAL CLEANER CAMERA DRUM SYSTEMS AND METHODS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. patent application Ser. No. 17/190,400, filed Mar. 3, 2021, entitled DOCKABLE CAMERA REEL AND CCU SYSTEM; U.S. Pat. No. 10,955,583, issued Mar. 23, 2021, entitled BORING INSPECTION SYSTEMS AND METHODS; U.S. Pat. No. 9,927,368, issued Mar. 27, 2021, entitled SELF-LEVELING INSPECTION SYSTEMS AND METHODS; U.S. Pat. No. 10,976,462, issued Apr. 13, 2021, entitled VIDEO INSPECTION SYSTEMS WITH PERSONAL COMMUNICATION DEVICE USER INTERFACES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/528,956, filed Nov. 17, 2021, entitled VIDEO INSPECTION SYSTEM, APPARATUS, AND METHODS WITH RELAY MODULES AND CONNECTION PORT; U.S. patent application Ser. No. 17/541,057, filed Dec. 2, 2021, entitled COLOR-INDEPENDENT MARKER DEVICE APPARATUS, METHODS, AND SYSTEMS; U.S. patent application Ser. No. 17/541,057, filed Dec. 2, 2021, entitled VIDEO INSPECTION SYSTEM, APPARATUS, AND METHODS WITH RELAY MODULES AND CONNECTION PORTCOLOR-INDEPENDENT MARKER DEVICE APPARATUS, METHODS, AND SYSTEMS; U.S. Pat. No. 11,193,767, issued Dec. 7, 2021, entitled SMART PAINT STICK DEVICES AND METHODS; U.S. Pat. No. 11,199,510, issued Dec. 14, 2021, entitled PIPE INSPECTION AND CLEANING APPARATUS AND SYSTEMS; U.S. Pat. No. 11,209,115, issued Dec. 28, 2021, entitled PIPE INSPECTION AND/OR MAPPING CAMERA HEADS, SYSTEMS, AND METHODS; U.S. patent application Ser. No. 17/563,049, filed Dec. 28, 2021, entitled SONDE DEVICES WITH A SECTIONAL FERRITE CORE; U.S. patent application Ser. No. 17/687,538, filed Mar. 4, 2022, entitled ANTENNAS, MULTI-ANTENNA APPARATUS, AND ANTENNA HOUSINGS; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; MODULAR BATTERY SYSTEMS INCLUDING INTERCHANGEABLE BATTERY INTERFACE APPARATUS; U.S. patent application Ser. No. 18/162,663, filed Jan. 31, 2023, entitled UTILITY LOCATING SYSTEMS AND METHODS WITH FILTER TUNING FOR POWER GRID FLUCTUATIONS; U.S. Pat. No. 11,614,613, issued Mar. 28, 2023, entitled DOCKABLE CAMERA REEL AND CCU SYSTEM; U.S. Pat. No. 11,649,917, issued May 16, 2023, entitled INTEGRATED FLEX-SHAFT CAMERA SYSTEM WITH HAND CONTROL; U.S. Pat. No. 11,665,321, issued May 30, 2023, entitled PIPE INSPECTION SYSTEM WITH REPLACEABLE CABLE STORAGE DRUM; U.S. Pat. No. 11,674,906, issued Jun. 13, 2023, entitled SELF-LEVELING INSPECTION SYSTEMS AND METHODS; U.S. Provisional Patent Application 63/510,014, filed Jun. 23, 2023, entitled INNER DRUM MODULE WITH PUSH-CABLE INTERFACE FOR PIPE INSPECTION; U.S. Pat. No. 11,686,878, issued Jun. 27, 2023, entitled ELECTRONIC MARKER DEVICES FOR BURIED OR HIDDEN USE; U.S. Provisional Patent Application 63/524,698, filed Jul. 2, 2023, entitled FILTERING METHODS AND ASSOCIATED UTILITY LOCATOR DEVICES FOR LOCATING AND MAPPING BURIED UTILITY LINES; U.S. Provisional Patent Application 63/514,090, filed Jul. 17, 2023, entitled SMARTPHONE MAPPING APPARATUS FOR ASSET TAGGING AS USED WITH UTILITY LOCATOR DEVICES; U.S. Pat. No. 11,709,289, issued Jul. 25, 2023, entitled SONDE DEVICES WITH A SECTIONAL FERRITE CORE; U.S. patent application Ser. No. 18/365,225, filed Aug. 3, 2023, entitled SYSTEMS AND METHODS FOR INSPECTION ANIMATION; U.S. Pat. No. 11,719,376, issued Aug. 8, 2023, entitled DOCKABLE TRIPODAL CAMERA CONTROL UNIT; U.S. Pat. No. 11,719,646, issued Aug. 8, 2023, entitled PIPE MAPPING SYSTEMS AND METHODS; U.S. Pat. No. 11,719,846, issued Aug. 8, 2023, entitled BURIED UTILITY LOCATING SYSTEMS WITH WIRELESS DATA COMMUNICATION INCLUDING DETERMINATION OF CROSS COUPLING TO ADJACENT UTILITIES; U.S. patent application Ser. No. 18/233,285, filed Aug. 11, 2023, entitled BURIED OBJECT LOCATOR; U.S. patent application Ser. No. 18/236,786, filed Aug. 22, 2023, entitled MAGNETIC UTILITY LOCATOR DEVICES AND METHODS; U.S. Pat. No. 11,747,505, issued Sep. 5, 2023, entitled MAGNETIC UTILITY LOCATOR DEVICES AND METHODS; U.S. patent application Ser. No. 18/368,510, filed Sep. 14, 2023, entitled MULTIFUNCTION BURIED UTILITY LOCATING CLIPS; U.S. patent application Ser. No. 18/365,203, filed Sep. 14, 2023, entitled SYSTEMS AND METHODS FOR ELECTRONICALLY MARKING, LOCATING AND VIRTUALLY DISPLAYING BURIED UTILITIES; U.S. Pat. No. 11,768,308, issued Sep. 26, 2023, entitled SYSTEMS AND METHODS FOR ELECTRONICALLY MARKING, LOCATING AND VIRTUALLY DISPLAYING BURIED UTILITIES; U.S. Pat. No. 11,769,956, issued Sep. 26, 2023, entitled MULTIFUNCTION BURIED UTILITY LOCATING CLIPS; U.S. Pat. No. 11,782,179, issued Oct. 10, 2023, entitled BURIED OBJECT LOCATOR WITH DODECAHEDRAL ANTENNA CONFIGURATION APPARATUS AND METHODS; U.S. Pat. No. 11,789,093, issued Oct. 17, 2023, entitled THREE-AXIS MEASUREMENT MODULES AND SENSING METHODS; U.S. Provisional patent application Ser. No. 18/490,763, filed Oct. 20, 2023, entitled LINKED CABLE-HANDLING AND CABLE-STORAGE DRUM DEVICES AND SYSTEMS FOR COORDINATED MOVEMENT OF PUSH-CABLE; U.S. Pat. No. 11,796,707, issued Oct. 24, 2023, entitled USER INTERFACES FOR UTILITY LOCATORS; U.S. patent application Ser. No. 18/544,042, filed Dec. 18, 2023, entitled SYSTEMS, APPARATUS, AND METHODS FOR DOCUMENTING UTILITY POTHOLES AND ASSOCIATED UTILITY LINES; U.S. Pat. No. 11,876,283, issued Jan. 16, 2024, entitled COMBINED SATELLITE NAVIGATION AND RADIO TRANSCEIVER ANTENNA DEVICES; U.S. Pat. No. 11,894,707, issued Feb. 6, 2024, entitled RECHARGEABLE BATTERY PACK ONBOARD CHARGE STATE INDICATION METHODS AND APPARATUS; U.S. Pat. No. 11,909,104, issued Feb. 20, 2024, entitled ANTENNAS, MULTI-ANTENNA APPARATUS, AND ANTENNA HOUSINGS; U.S. Provisional Patent Application 63/558,098, filed Feb. 26, 2024, entitled SYSTEMS, DEVICES, AND METHODS FOR DOCUMENTING GROUND ASSETS AND ASSOCIATED UTILITY LINES; U.S. Pat. No. 11,921,225, issued Mar. 5, 2024, entitled ANTENNA SYSTEMS FOR CIRCULARLY POLARIZED RADIO SIGNALS; U.S. patent application Ser. No. 18/611,449, filed Mar. 20, 2024, entitled VIDEO INSPECTION AND CAMERA HEAD TRACKING SYSTEMS AND METHODS; U.S. Pat. No. 11,953,643, issued Apr. 9, 2024, entitled MAP GENERATION BASED ON UTILITY LINE POSITION AND ORIENTATION ESTIMATES; U.S. Provisional Patent 63/643,915, filed May 7, 2024, entitled SYSTEMS AND METHODS FOR LOCATING AND MAPPING BURIED UTILITY OBJECTS USING ARTIFICIAL INTELLIGENCE WITH LOCAL OR REMOTE PROCESSING; U.S. Provisional Patent 63/659,722, filed Jun. 13, 2024, entitled VEHICLE-MOUNTING DEVICES AND METHODS FOR USE IN VEHICLE-BASED LOCATING SYSTEMS; and U.S. Provisional application Ser. No. 18/758,937, filed Jun. 28, 2024, entitled FILTERING METHODS AND ASSOCIATED UTILITY LOCATOR DEVICES FOR LOCATING AND MAPPING BURIED UTILITY LINES. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Terminology

As used herein, the term "position" may refer to a location or geolocation as well as a pose or orientation in three-dimensions at that location. For instance, a geolocation determined by GNSS may further include a pose or orientation at the geolocation determined via one or more inertial sensors (e.g., accelerometers, gyroscopic sensors, magnetometers, and the like). Further, the INS may include one or more barometers.

The term "electromagnetic signals" or "signals" as used herein may refer to the radiation of electromagnetic energy, and in particular to the associated magnetic field vectors. Such electromagnetic signals may be from current coupled to a conductive utility line, current inherently flowing through a utility line (e.g., power line), the re-radiation of electromagnetic energy (e.g., broadcast radio signals or the like), and other radiation of electromagnetic energy from other sources that may be measured via a utility locator device.

The term "median plane" may refer to a hypothetical plane vertically bisecting the bilaterally symmetrical utility locator device. The median plane may run from the top to the bottom of the utility locator device separating the utility locator device into right and left halves as illustrated in FIG. 1A. In the present disclosure, the median plane is used to describe alignment of camera or cameras of a smartphone as retained by a smartphone mounting apparatus of the present invention.

The term "align" in relation to the camera or cameras of a smartphone and the median plane of a utility locator device when retained in a smartphone mounting apparatus of the present disclosure may refer to an approximation of the positions relative to one another. For instance, the term "align" as used herein may not necessarily exactly share space in the median plane. In some embodiments, the camera or cameras of a smartphone may align with the median plane of a utility locator device where the camera(s) are offset from the median plane by a number of inches but the frame of view of the camera(s) may still capture images and/or videos of an asset.

The term "asset" may refer to any object or attribute in the locate environment which may be of interest in locating or mapping utility lines. For instance, some "assets" may be or include objects and attributes tagged as a reference in correlating utility line positions in the ground to mapping data representing the ground surface. Further, some "assets" may be or include objects and attributes tagged based on a user's identifying the object's or attribute's potential influence on the electromagnetic signals measured by the utility locator device.

The term "asset tagging data" may refer to the data generated by a rangefinder apparatus used in tagging assets or objects in a locating environment. Such "asset tagging data" includes the geolocation of the tagged asset. The asset tagging data herein may be correlated with still images and/or video of an asset generated by a smartphone retained in a smartphone mounting apparatus of the present invention. Such data may, in some embodiments, further be correlated with electromagnetic signal data and utility line positions determined via the utility locator device and/or notes or other user input.

The term "correlate" as used herein may refer to an association or relationship between data/information or other aspects of the utility locating and/or asset tagging operations. Likewise, the terms "correlating" and "correlated" may refer to identifying or establishing a link or relationship between information/data or other aspects of the utility locating and/or asset tagging operations. Such correlations may spatially align or otherwise have a spatial relationship. For instance, electromagnetic data may have a correlating spatial relationship with tagged assets or other images of the locating environment. In other embodiments, such correlations may refer to relationships between data or sets of data. For instance, in some embodiments, such as the method 1100 of FIG. 11 or the AI method 1300 of FIG. 13, a correlation may be identified between utility line types as determined through images of the locate environment and the patterns in electromagnetic signals.

EXAMPLE EMBODIMENTS

Turning to FIG. 1A, a utility locator device 100 is illustrated which may have a smartphone mounting apparatus 120 of the present invention to selectively retain a smartphone 140 at a known position and orientation relative to the utility locator device 100. The utility locator device 100 may have an antenna array 101 and an associated receiver 102 (FIG. 1D) to measure electromagnetic signals across a range of frequencies and determine the position of utility lines relative to the utility locator device 100, such as a signal 155 emitted by a utility line 150. The utility locator device 100 may be or share aspects with the utility locator devices disclosed in U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; U.S. Pat. No. D922,885, issued Jun. 22, 2021, entitled BURIED OBJECT LOCATOR; U.S. Pat. No. 11,196,181, issued Dec. 7, 2021, entitled LOW COST, HIGH PERFORMANCE SIGNAL PROCESSING IN A MAGNETIC-FIELD SENSING BURIED UTILITY LOCATOR SYSTEM; and/or others disclosed in the incorporated patents and applications. The content of each of these applications is incorporated by reference herein in its entirety.

The utility locator device 100 may further determine geolocations and orientation/pose at those geolocations, referred to herein as "geospatial data," in order to further map buried utility lines such as the utility line 150. For instance, the utility locator device 100 may include one or more GNSS 103 to receive navigation signals 165 from a plurality of GNSS satellites 160 in determining geolocations of the utility locator device 100. Further, the utility locator device 100 may include an inertial navigation system (INS) 104 (FIG. 1D) and/or other apparatus to determine the position and orientation or pose of the utility locator device 100 in the world frame. Such position and orientation/pose determining apparatus may be or share aspects with those disclosed in U.S. Pat. No. 9,081,109, issued Jul. 14, 2015, entitled GROUND-TRACKING DEVICES FOR USE WITH A MAPPING LOCATOR; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,784,837, issued Oct. 10, 2017, entitled OPTICAL GROUND TRACKING APPARATUS, SYSTEMS, AND METHODS; U.S. patent application Ser. No. 15/811,361, filed Nov. 13, 2017, entitled OPTICAL GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/430,225, filed Jun. 3, 2019, entitled MAGNETIC SENSING GROUND TRACKING DEVICES AND METHODS; U.S. patent application Ser. No. 17/502,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/728,949, filed Apr. 25, 2022, entitled BURIED UTILITY LOCATOR GROUND TRACKING APPARATUS, SYSTEMS, AND METHODS; U.S. Pat. No. 11,428,814, issued Aug. 30, 2022, entitled OPTICAL GROUND TRACKING APPARATUS, SYSTEMS, AND METHODS FOR USE WITH BURIED OBJECT UTILITY LOCATORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,953,643, issued Apr. 9, 2024, entitled MAP GENERATION BASED ON UTILITY LINE POSITION AND ORIENTATION ESTIMATES; U.S. Pat. No. 11,988,755, issued May 21, 2024, entitled UTILITY LOCATING DEVICES EMPLOYING MULTIPLE SPACED APART GNSS ANTENNAS; and/or others disclosed in the incorporated patents and applications. The content of each of these applications is incorporated by reference herein in its entirety.

Further, the utility locator device 100 may include a rangefinder apparatus 105 for tagging assets in the locating environment such as an asset 170. The rangefinder apparatus 105 may be or share aspects with U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled TRACKED DISTANCE MEASURING DEVICES, SYSTEMS, AND METHODS; and/or other devices disclosed in the incorporated patents and applications. The content of each of these applications is incorporated by reference herein in its entirety.

Still referring to FIG. 1A, when retained in the smartphone mounting apparatus 120, a smartphone 140 may be positioned such that one or more cameras 141 may align with a median plane 180 vertically bisecting the utility locator device 100. It should be noted, the alignment may be approximate such that the position of the cameras 141 may be offset from the median plane 180 by a number of inches but a frame of view 142 of the camera(s) 141 may still capture images and/or videos of an asset 170. In other embodiments, cameras need not align with such a median plane but may be used herein to describe some possible geometries of a smartphone mounting apparatus in keeping with the present invention.

It should also be noted that in some embodiments the camera or cameras may be or include LiDAR or other three-dimensional imaging apparatus to generate a three-dimensional image of an asset such as the asset 170. The smartphone mounting apparatus 120 may have an opening 121 such that the field of view 142 of the camera(s) 141 may be unobstructed by the smartphone mounting apparatus 120 in generating images and/or video of the asset 170 in the locating environment. Further, the smartphone mounting apparatus 120 may include a notch 122 such that, when installed, the smartphone mounting apparatus 120 may not block access to the data and charging port on the smartphone 140 allowing the smartphone 140, in some embodiments, to be plugged into a cable for purposes of charging and/or data transfer with the utility locator device 100 or other device.

As illustrated, the smartphone 140, supported by a smartphone mounting apparatus 120, and the utility locator device 100 may wireless communicate data (e.g., via wireless module which may be or include Bluetooth, Wi-Fi, cellular radio, ISM radio, or the like). For instance, the smartphone 140 may include a wireless module 143 (FIG. 1D) to transmit and receive data in communicating with a wireless module 110 (FIG. 1D) in the utility locator device. Such data may be or include images and/or video of tagged assets 170 generated via the smartphone 140. Likewise, such data may be related to mapped utility lines and/or other data measured by the utility locator device 100 and other connected devices and apparatus. It should also be noted that such data may be wirelessly communicated from the utility locator device 100 and/or the smartphone 140 with one or more remote databases and/or other computing devices 190 (e.g., cloud servers, other system devices or the like). In some embodiments, such data may instead be communicated via a wired connection between a smartphone and a utility locator device.

Still referring to FIG. 1A, data generated by the utility locator device 100 and the connected smartphone 140 may be communicated with one or more other system devices 195 (e.g., transmitter device, pipe Sonde, camera control unit, pipe inspection camera, camera reel, and/or the like) and, likewise, data generated via the other system devices 195 may be communicated with the utility locator device 100 and the smartphone 140. For instance, in some embodiments, the smartphone 140 or utility locator device 100 might turn a pipe Sonde on or off on a camera system. Likewise, the smartphone 140 or utility locator device 100 may receive video or images from a pipe inspection camera or camera reel or camera control unit or other connected system device 195 for display on the smartphone 140 or utility locator device 100.

As further illustrated in FIG. 1A, the smartphone mounting apparatus 120 may include a retainer element 123 to selectively retain a smartphone 140. For instance, magnets, brackets, and/or other mechanism which may grasp and hold onto the smartphone 140 while in use but may selectively be released or otherwise cause the smartphone 140 to become dislodged from the smartphone mounting apparatus 120 when desired by a user. It should be noted that in some embodiments a retainer element may be adjustable to accommodate smartphones of different shapes and sizes (e.g., such as that illustrated in the smartphone mounting apparatus 320 of FIGS. 3A and 3B).

Figure 1B:
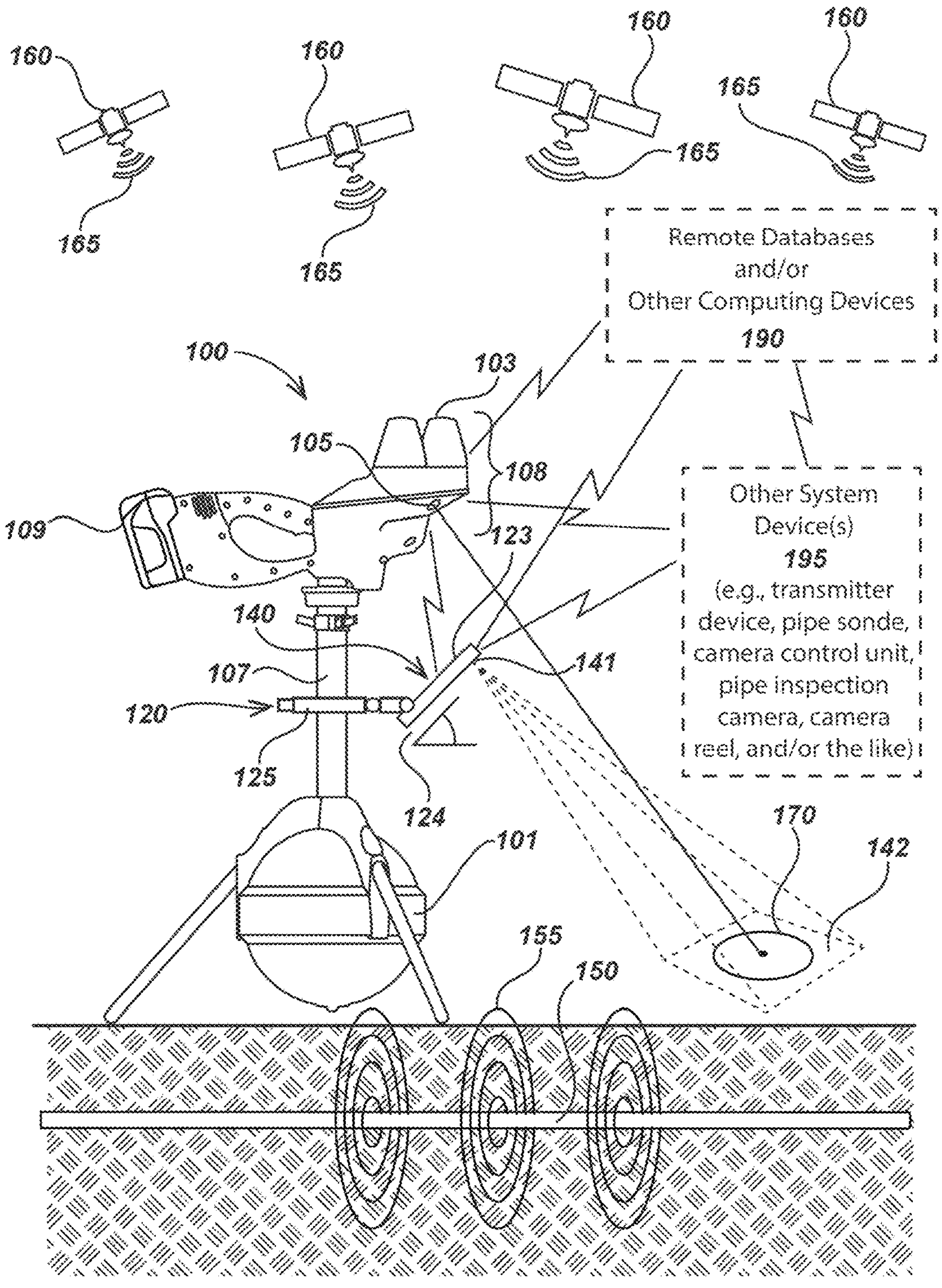
FIG. 1B is another illustration of the utility locator device and smartphone mounting apparatus of FIG. 1A demonstrating having a smartphone mounting apparatus with a fixed angle orientation.

Turning in FIG. 1B, the smartphone mounting apparatus 120 may include an angle orientation 124 orienting the smartphone 140 at an angle such that the field of view 142 of the camera(s) 141 may capture assets, such as an asset 170, on the ground. Likewise, the rangefinder apparatus 105 may simultaneously determine distance to and ultimately map the geolocation of the asset 170. In some embodiments, an adjustable angle orientation element may be used to facilitate an adjustable angle orientation of the field of view in capturing still and video images of an asset to be tagged at the ground surface (e.g., such as that illustrated in the smartphone mounting apparatus 420 of FIG. 4).

Figure 1C:
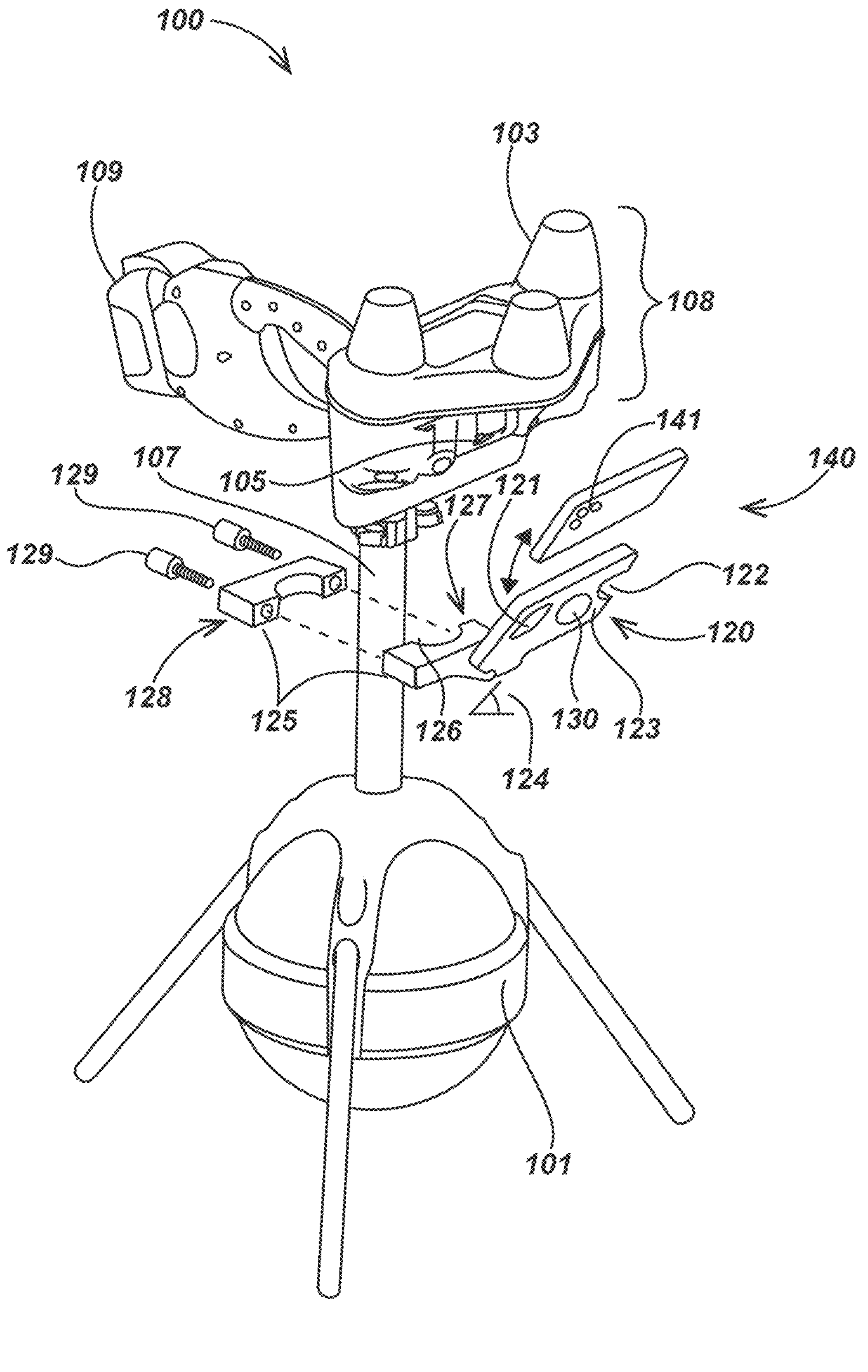
FIG. 1C is another illustration of the utility locator device and smartphone mounting apparatus of FIG. 1A demonstrating the mounting element.

Turning to FIG. 1C, the smartphone mounting apparatus 120 may include a mounting element 125 allowing the smartphone mounting apparatus 120 to be secured along a mast 107 on the utility locator device 100. The mounting element 125 of the smartphone mounting apparatus 120 may include a semicircular grove 126 formed on a forward mounting apparatus half 127 that, in assembly, may mate with a semicircular back half 128 and tighten about the mast 107 of the utility locator device 100 via hand screws 129 and thereby secure the smartphone mounting apparatus 120 to the utility locator device 100. In other embodiments, a smartphone mounting apparatus of the present invention may mount to the head of a utility locator device (e.g., a head 108 of the utility locator device 100) or elsewhere on a utility locator device. In other embodiments, a mounting element may employee other types of screws and bolts, adhesives, magnetics, and/or other mechanisms and materials to mount a smartphone mounting apparatus in keeping with the present invention with a utility locator device.

As further illustrated in FIG. 1C, a wireless charging mechanism 130 may be included in the retainer element 123 of the smartphone mounting apparatus 120 allowing the smartphone 140 to be magnetically retained in the smartphone mounting apparatus 120 as well as wirelessly charging a battery 145 (FIG. 1D) in the smartphone 140 from a battery 109 in the utility locator devices 100. For instance, a wire 131 may carry electrical current from the battery 109 (FIG. 1D) in the utility locator device 100 to a wireless charging mechanism 130 of the smartphone mounting apparatus 120 in providing electrical power to a battery 145 in the retained smartphone 140. In such embodiments, communication between a smartphone and a utility locator device may occur via wireless module (e.g., a wireless module 110) which may be or include Bluetooth, Wi-Fi, cellular radio, ISM radio, or the like. In other embodiments, electrical power may be provided by an external battery pack (e.g., an external battery pack 527 illustrated in FIG. 5). In yet further embodiments, electrical power and/or data may be provided via a wired connection plugging directly into the smartphone.

Figure 1D:
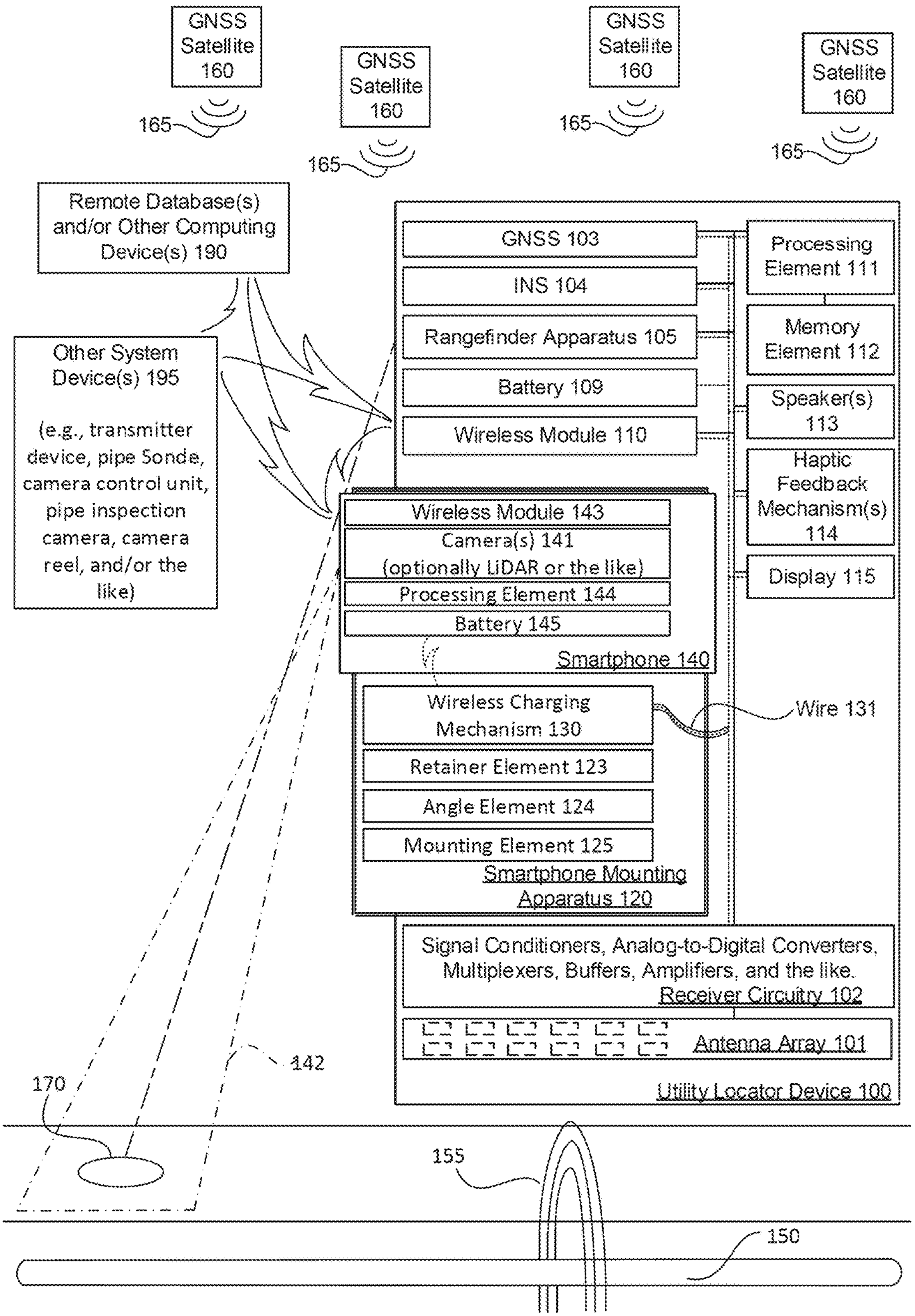
FIG. 1D is a diagram of the utility locator device, smartphone mounting apparatus, and smartphone of FIG. 1A.

Turning to FIG. 1D, a diagram of the utility locator device 100 including the smartphone mounting apparatus 120 is provided. The utility locator device 100 is shown having a dodecahedral antenna array 101 and a receiver circuitry 102 which may, for example, include one or more buffers, amplifiers, signal conditioners, analog-to-digital (A/D) converters, multiplexers, and the like to provide filtering functionality, signal conditioning, or the like for outputs to a processing element 111 having one or more processor to determine the emission positions of a plurality of electromagnetic signals, such as the electromagnetic signal 155, relative to the utility locator device 100. The processing element 111 may further couple with a memory element 112 having one or more non-transitory memories for the storage of data such as that relating to mapped buried utility lines, tagged assets, photographs/video of tagged assets, and the like.

The utility locator device 100 may further include one or more GNSS 103 and INS 104 (e.g., one or more accelerometers, gyroscopes, magnetometers, and the like) in determining geolocations and positions or poses at the geolocations. Such positioning data may further be used in mapping utility lines emitting electromagnetic signals such as the utility line 150 emitting the signal 155. Likewise, as disclosed with the method 1100 of FIG. 11, assets or other objects identified in images of the locate environment generated by cameras (e.g., the cameras 141 of the smartphone 140 and/or the cameras 1006 of the utility locator device 1000 illustrated in FIGS. 10A and 10B) may be correlated with like features in pre-existing maps in mapping electromagnetic signals and utility lines.

Still referring to FIG. 1D, the rangefinder apparatus 105 may tag assets such as the asset 170 and determine and map the geolocation thereof. Such position data of tagged assets may be associated with images/video of the asset 170 generated device via the processing element 111 in the utility locator device 100 and/or a processing element 144 in the smartphone 140 and/or a processing element in a remote database and/or other computing device(s) 190 (e.g., cloud servers, other system devices, or the like) and/or processors in other connected devices.

A wireless module 110 (e.g., Bluetooth, Wi-Fi, cellular radio, ISM radio, or the like) may be included in the utility locator device 100 in communicating data between the smartphone 140 (also having a wireless module 143) and the utility locator device 100. Likewise, the wireless module 110 of the utility locator device 100 and the wireless module 143 of the smartphone 140 may communicate data related to mapped utility lines and/or images of tagged assets and related data and/or other data measured by the utility locator device 100 and other connected devices and apparatus with one or more remote databases and/or other computing device(s) 190 (e.g., cloud servers, other system devices, or the like).

Still referring to FIG. 1D, data generated by the utility locator device 100 and the connected smartphone 140 may be communicated with one or more other system devices 195 (e.g., transmitter device, pipe Sonde, camera control unit, pipe inspection camera, camera reel, and/or the like) and, likewise, data generated via the other system devices 195 may be communicated with the utility locator device 100 and the smartphone 140. For instance, in some embodiments, the smartphone 140 or utility locator device 100 might turn a pipe Sonde on or off on a camera system. Likewise, the smartphone 140 or utility locator device 100 may receive video or images from a pipe inspection camera or camera reel or camera control unit or other connected system device 195 for display on the smartphone 140 or utility locator device 100.

In some embodiments (e.g., the utility locator device 1000 of FIGS. 10A and 10B), one or more cameras disposed in a utility locator device may generate images of the locate environment that may further be communicated to a smartphone for analysis and processing. For instance, the smartphone may receive images, electromagnetic data, geospatial data, and/or other data and tag asset (e.g., via method 700 of FIG. 7), identify assets present in the locate environment and determine utility line type (e.g., via method 1100 of FIG. 11), determine utility line types (e.g., via method 1100 of FIG. 11), mapping of electromagnetic signals and utility lines (e.g., via method 1100 of FIG. 11), and other processing/analysis. It should be noted that in such embodiments that a smartphone may or may not be held in smartphone mounting apparatus of the present disclosure.

Still referring to FIG. 1D, the battery 109 of the utility locator device 100 may distribute electrical power to the various powered element of the utility locator device 100 as well as to, via the wire 131, the wireless charging mechanism 130 of the smartphone mounting apparatus 120. The battery 109 may be or share aspects with those disclosed in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. Pat. No. 11,171,369, issued Nov. 9, 2021, entitled MODULAR BATTERY PACK APPARATUS, SYSTEMS, AND METHODS; U.S. Pat. No. 11,894,707, issued Feb. 6, 2024, entitled RECHARGEABLE BATTERY PACK ONBOARD CHARGE STATE INDICATION METHODS AND APPARATUS; and/or other devices disclosed in the incorporated patents and applications. The content of each of these applications is incorporated by reference herein in its entirety.

Still referring to FIG. 1D, the utility locator device 100 may include one or more elements to communicate information to a user information regarding positions and depths of buried utility lines, tagged assets, other device or system information, and the like. For instance, the utility locator device 100 may include one or more speakers 113, haptic feedback mechanisms 114, as well as a display 115 and the like. In some embodiments, the image and/or video of tagged assets may be communicated from the smartphone 140 to the utility locator device 100 and shown on the display 115.

Figure 2:
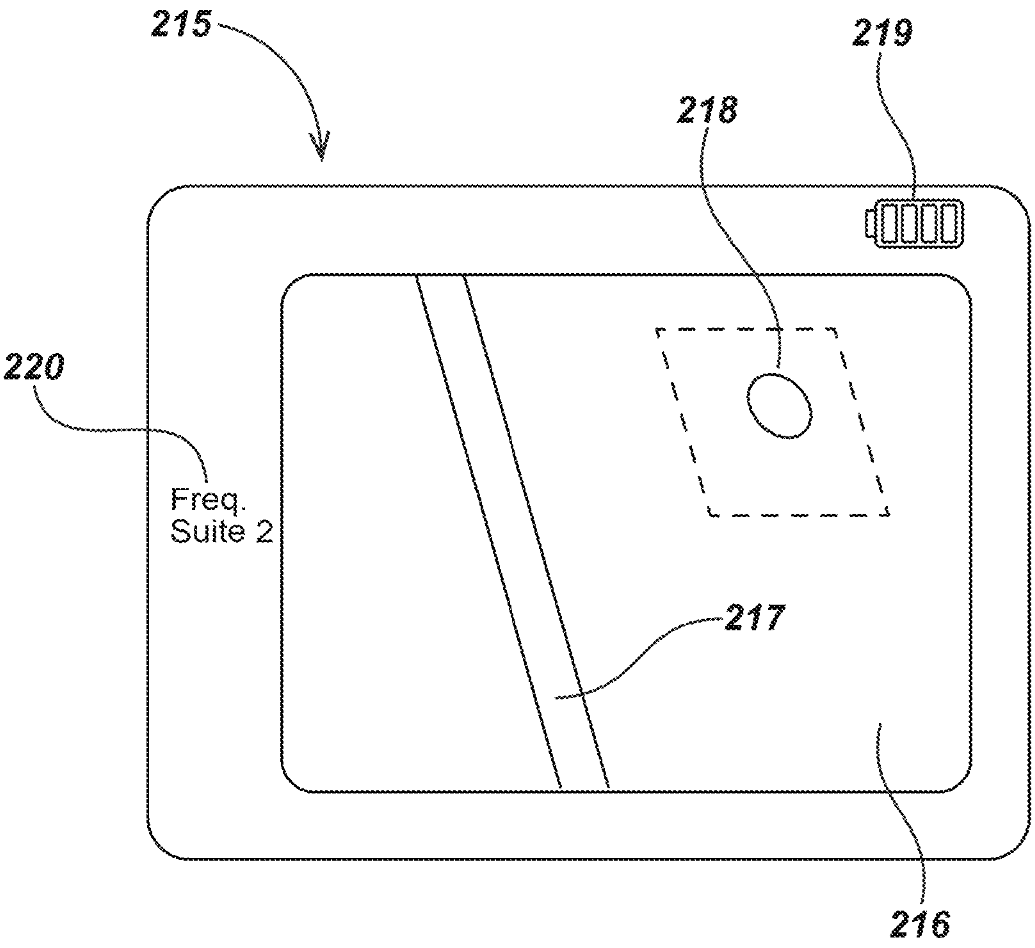
FIG. 2 is an illustration of an exemplary display as used in a utility locator device.

Turning to FIG. 2, an exemplary display 215 is illustrated which may be or share aspects with the display 115 of FIG. 1D. As shown, the display 215 may show a map 216 including positions of one more utility lines such as a utility line 217. Further, an asset image 218 which may be shown in situ in the map 216. The display 215 may further include various device data such as the battery level indicator 219, a frequency suite 220 indicating the frequency suites measured, and the like.

Figure 3A:
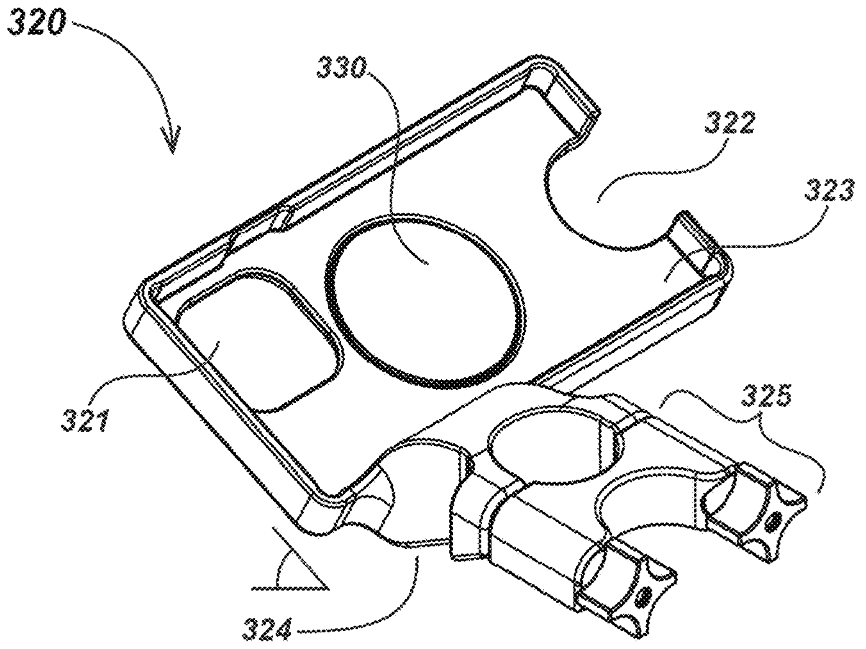
FIGS. 3A and 3B are illustrations of a smartphone mounting apparatus that may be adjustable to accommodate smartphones of different sizes.
Figure 3B:
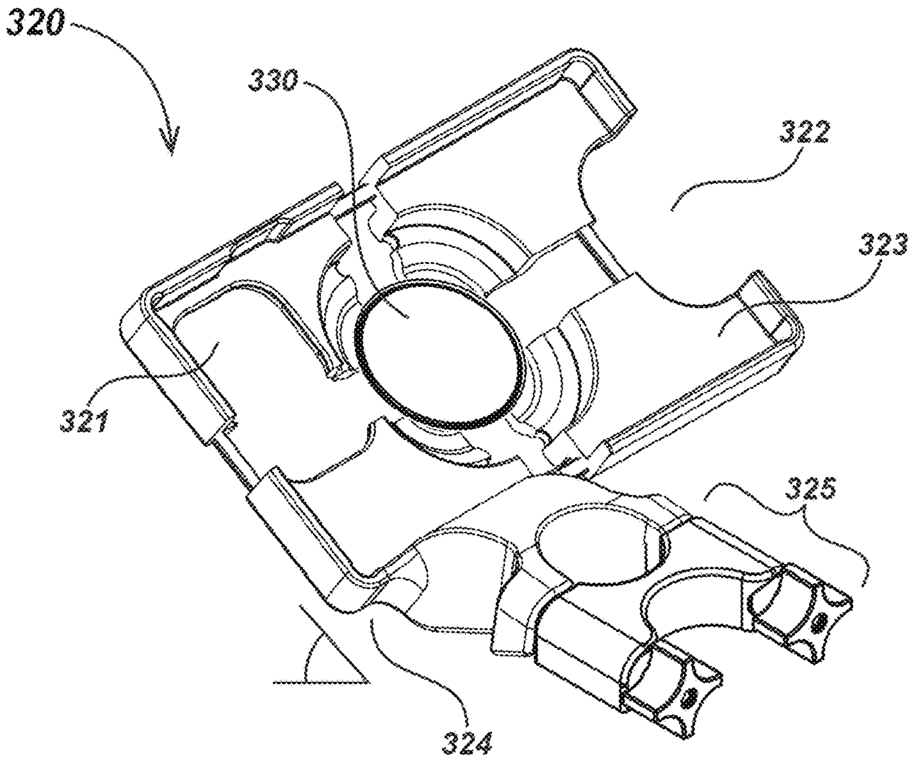

In some embodiments in keeping with the present disclosure may adjust to accommodate different makes and models of smartphones that may be different sizes. Turning to FIGS. 3A and 3B, a smartphone mounting apparatus 320 in keeping with the current disclosure which may be or share aspects with the smartphone mounting apparatus 120 respectively as disclosed in FIGS. 1A-1D with the exception that the smartphone mounting apparatus 320 may adjust to accommodate different sized smartphones. For instance, the smartphone mounting apparatus 320 may include a retainer element 323 that may extend outward in two directions thus accommodating different makes and models of smartphones of different sizes. The smartphone mounting apparatus 320 may include an opening 321 dimensioned to accommodate a variety of different makes and models of smartphones that may have different numbers and sizes of cameras in various positions. Further, the smartphone mounting apparatus 320 may include a notch 322 such that when installed the smartphone mounting apparatus 320 may not block access to the data and charging port on a smartphone allowing the smartphone to be plugged into a cable for purposes of charging and/or data transfer with a utility locator device (e.g., the utility locator device 100 of FIGS. 1A, 1B, 1C, and 1D) or other device. The smartphone mounting apparatus 320 may further include a retainer element 323 to selectively retain a smartphone (e.g., the smartphone 140 of FIGS. 1A, 1B, 1C, and 1D). A wireless charging mechanism 330 may be included in the retainer element 323 to magnetically retain and charge the battery of a smartphone. The smartphone mounting apparatus 320 may further include an angle orientation 324 orienting a smartphone at an angle such that the field of view of the camera(s) of a retained smartphone may capture assets on the ground (e.g., the asset 170 of FIG. 1A). Further, the smartphone mounting apparatus 320 may include a mounting element 325 allowing the smartphone mounting apparatus 320 to be secured along a mast on a utility locator device (e.g., the mast 107 of the utility locator device 100 illustrated in FIG. 1A) or, in other embodiments, a head of the utility locator device (e.g., the head 108 of the utility locator device 100 illustrated in FIG. 1A) or other location on a utility locator device. A wireless charging mechanism 330 may be included in the smartphone mounting apparatus 320 allowing a smartphone to be magnetically retained in the smartphone mounting apparatus 320 as well as wirelessly charging a battery in the smartphone from other power source (e.g., the battery in a coupled utility locator device or the like).

Figure 4:
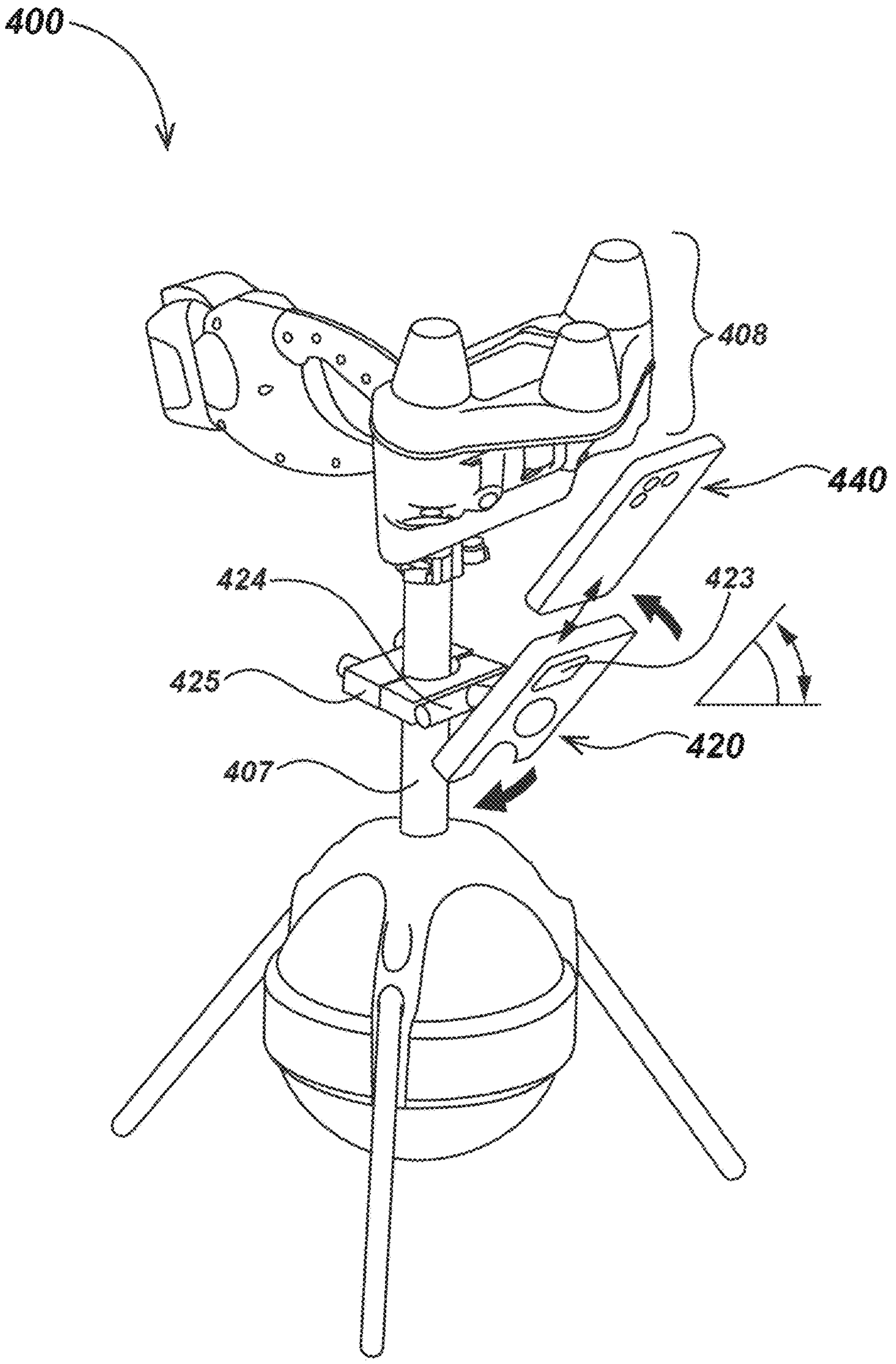
FIG. 4 is an illustration of a smartphone mounting apparatus having an adjustable angle orientation element.

In some embodiments in keeping with the present disclosure the angle orientation may be adjustable via an adjustable angle orientation element to correct the orientation of the field of view of a smartphones cameras when retained in a smartphone mounting apparatus. Turning to FIG. 4, a utility locator device 400 is illustrated having a smartphone mounting apparatus 420 in keeping with the current disclosure. The utility locator device 400 and the smartphone mounting apparatus 420 may be or share aspects with the utility locator device 100 and the smartphone mounting apparatus 120 respectively as disclosed in FIGS. 1A-1D with the exception that the angle at which the smartphone mounting apparatus 420 may be oriented is adjustable. For instance, The smartphone mounting apparatus 420 may include a retainer element 423 to selectively retain a smartphone 440 and an adjustable angle orientation element 424 orienting the smartphone 440 at an angle such that the field of view 442 of the camera(s) 441 may capture assets, such as an asset 470, on the ground. It should be noted that in some embodiments the camera or cameras may be or include LiDAR or other three-dimensional imaging apparatus to generate a three-dimensional image of an asset such as the asset 470. Further, the smartphone mounting apparatus 420 may include a mounting element 425 allowing the smartphone mounting apparatus 420 to be secured along a mast 407 on the utility locator device 400 or, in other embodiments, a head 408 of the utility locator device 400 or other location on the utility locator device 400. The adjustable angle orientation element 424 may adjust allowing the field of view 442 of the camera(s) 441 of the smartphone 440 in the smartphone mounting apparatus 420. For instance, a user may make corrections adjusting the adjustable angle orientation element 424 to ensure the asset 470 is captured in the field of view 442 of the camera(s) 441 of the smartphone 440 when retained by the smartphone mounting apparatus 420. It should be noted that in some embodiments the camera or cameras may be or include LiDAR or other three-dimensional imaging apparatus to generate a three-dimensional image of an asset. In embodiments wherein the angle orientation is adjustable, the orientation of the smartphone may be determined via INS in the smartphone and communicated to the utility locator device. In yet further embodiments, an adjustable angle orientation element may be motorized (not illustrated) and adjusting of the frame of view of cameras may be adjusted by a user at the utility locator device or may automatically adjust based on keeping the spot measured by a rangefinder apparatus in the field of view of the cameras.

Figure 5:
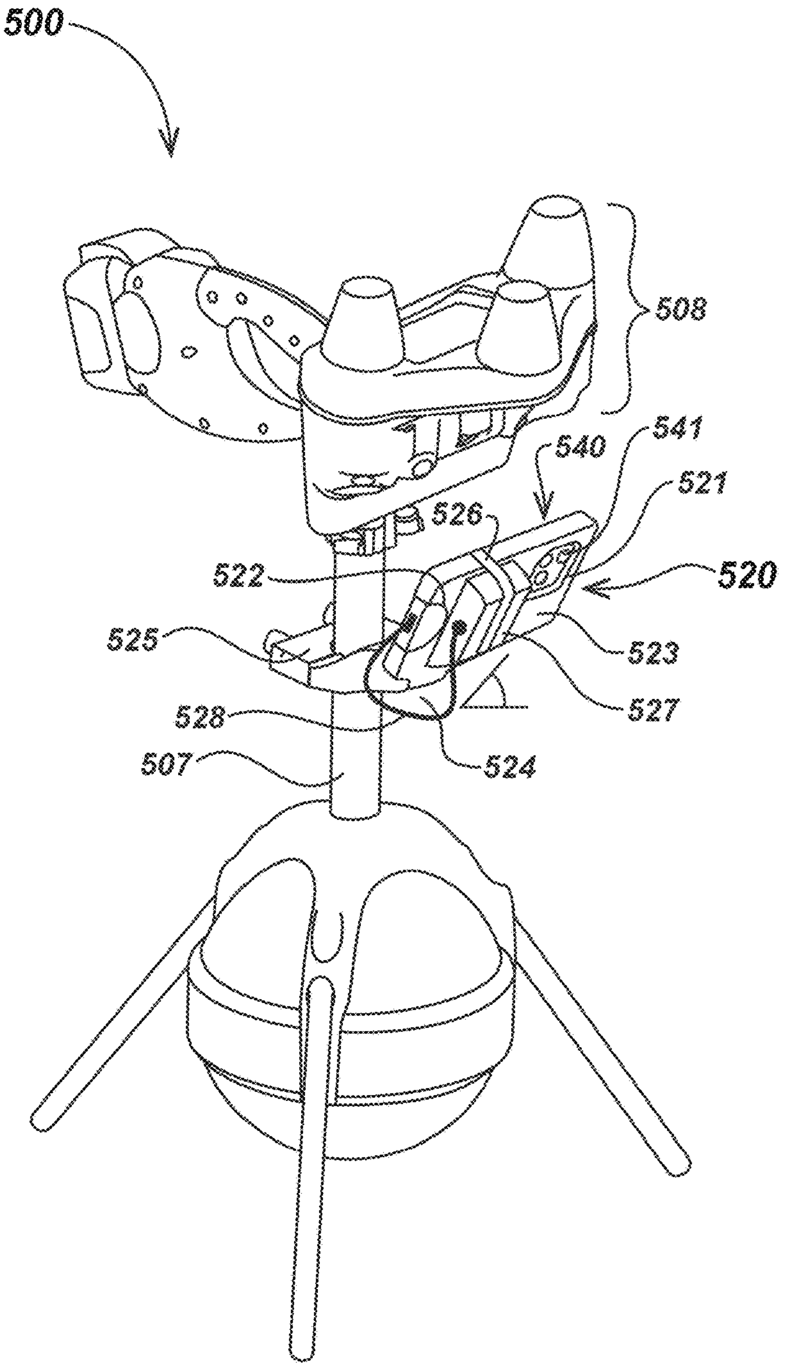
FIG. 5 is an illustration of a smartphone mounting apparatus having a battery.

In some embodiments in keeping with the present disclosure a smartphone mounting apparatus may include a battery for charging a retained smartphone. Turning to FIG. 5, a utility locator device 500 is illustrated having a smartphone mounting apparatus 520 in keeping with the current disclosure. The utility locator device 500 and the smartphone mounting apparatus 520 may be or share aspects with the utility locator device 100 and the smartphone mounting apparatus 120 respectively as disclosed in FIGS. 1A-1D with the addition of a battery pack 527 for charging a smartphone 540 (largely obscured in FIG. 5). The battery pack 527 may secure to the smartphone mounting apparatus 520 via a strap 526. The smartphone mounting apparatus 520 may further include an opening 521 such that a retainer element 523 configured to selectively retain the smartphone 540 may not obstruct the field of view of one or more cameras 541 of the smartphone 540. Further, the smartphone mounting apparatus 520 may include a notch 522 such that when installed the smartphone mounting apparatus 520 may not block access to the data and charging port on a smartphone allowing the smartphone 540 to be plugged into a cable 528 for purposes of charging the smartphone 540 via the battery pack 527. The smartphone mounting apparatus 520 may further include an angle orientation 524 orienting a smartphone at an angle such that the field of view of the camera(s) of a retained smartphone may capture assets on the ground (e.g., the asset 170 of FIG. 1A). Further, the smartphone mounting apparatus 520 may include a mounting element 525 allowing the smartphone mounting apparatus 520 to be secured along a mast 507 on the utility locator device 500 or, in other embodiments, a head 508 of the utility locator device 500 or other location on a utility locator device.

A smartphone mounting apparatus in keeping with the present disclosure may couple to the head or elsewhere on a utility locator device besides the mast of a utility locator device. In some such embodiments, the user interface of the smartphone may be viewable and otherwise accessible to the user while carrying the utility locator device.

Figure 6A:
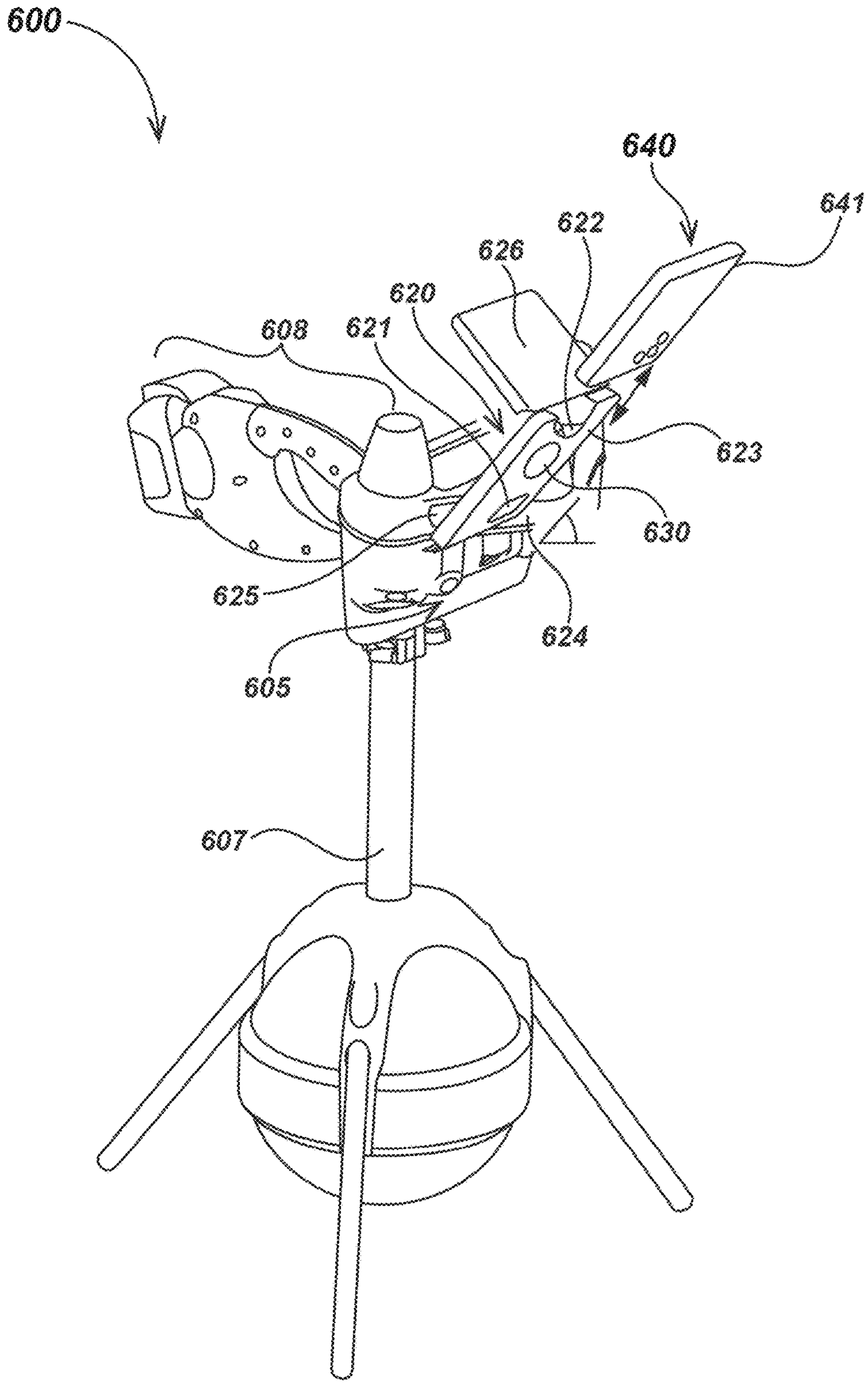
FIGS. 6A and 6B are illustrations of a smartphone mounting apparatus mounting to the head of a utility locator device.
Figure 6B:
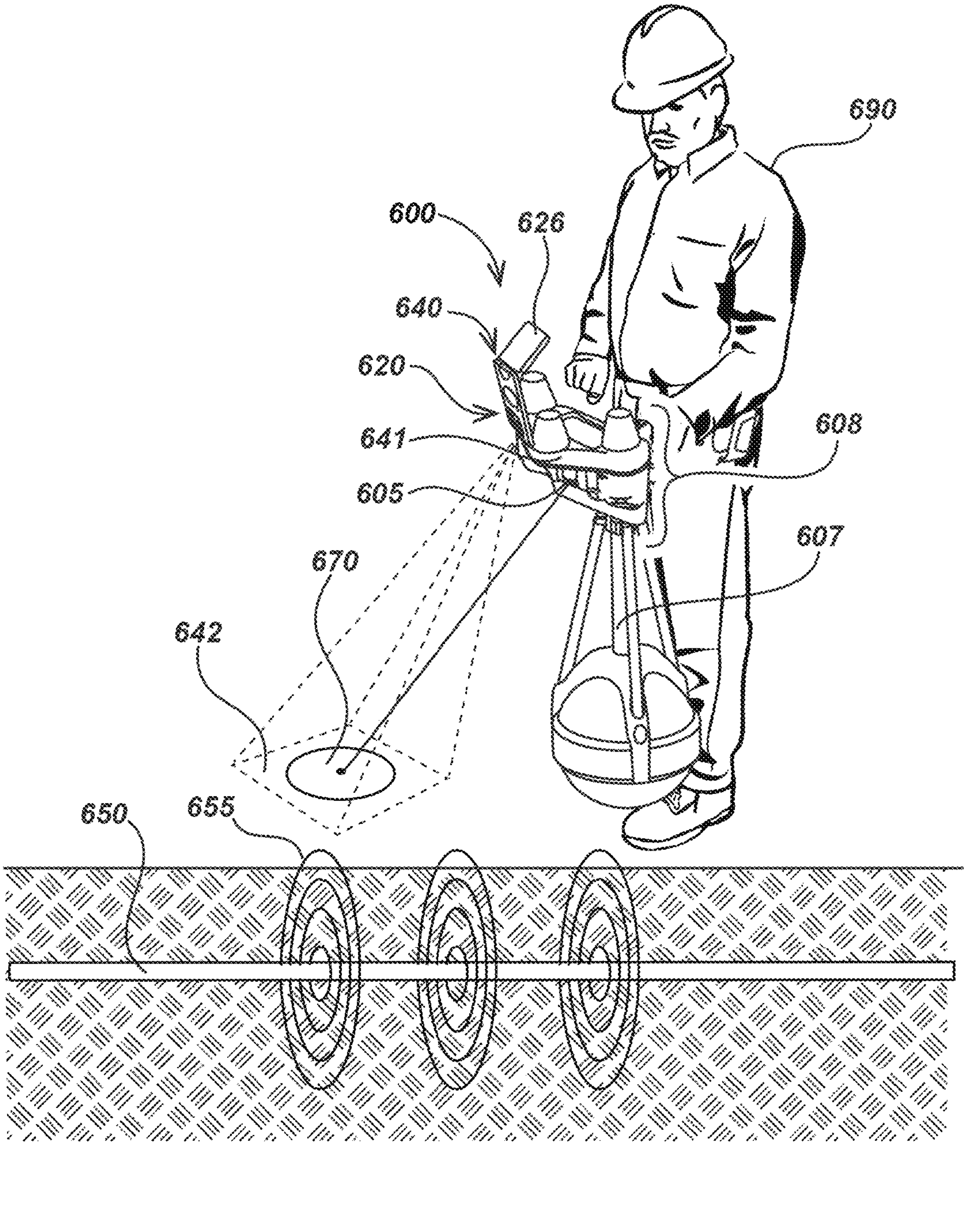

Turning to FIGS. 6A and 6B, a utility locator device 600 is illustrated having a smartphone mounting apparatus 620 in keeping with the current disclosure. The utility locator device 600 and the smartphone mounting apparatus 620 may be or share aspects with the utility locator device 100 and the smartphone mounting apparatus 120 respectively as disclosed in FIGS. 1A-1D wherein the smartphone mounting apparatus 620 is mounted vertically to a head 608 on the utility locator device 600 rather than along a mast 607. The smartphone mounting apparatus 620 may further include an opening 621 (FIG. 6A) such that a retainer element 623 (FIG. 6A) configured to selectively retain the smartphone 640 may not obstruct a field of view 642 (FIG. 6B) of one or more cameras 641 on a smartphone 640. Further, the smartphone mounting apparatus 620 may include a notch 622 (FIG. 6A) such that when installed the smartphone mounting apparatus 620 may not block access to the data and charging port on the smartphone 640. The smartphone mounting apparatus 620 may further include an angle orientation 624 (FIG. 6A) orienting a smartphone at an angle such that the field of view 642 (FIG. 6B) of the camera(s) 641 of the retained smartphone 640 may capture asset 670 (FIG. 6B) on the ground. It should be noted that in some embodiments the camera or cameras may be or include LiDAR or other three-dimensional imaging apparatus to generate a three-dimensional image of an asset such as the asset 670 (FIG. 6B). Further, the smartphone mounting apparatus 620 may include a mounting element 625 allowing the smartphone mounting apparatus 620 to be secured to the head 608 of utility locator device 600. Optionally, the smartphone mounting apparatus 620 may include a sun hood 626. The sun hood 626 may shield the display of the smartphone 640 from sunlight.

Turning to FIG. 6B, the utility locator device 600 having the smartphone 640 retained in the smartphone mounting apparatus 620 is illustrated being held by a user 690. As illustrated, the user 690 may view and access the user interface of the smartphone 640 while holding the utility locator device 600 as intended. Having the smartphone 640 accessible to the user 690 holding the user interface device 600 may more readily facilitate tagging of assets such as the asset 670 tagged via a rangefinder apparatus 605 in the utility locator device while also capturing the asset 670 in the field of view 642 of the cameras 641 in generating images and/or video of the asset 670 and simultaneously determining and mapping one or more utility lines via electromagnetic signals such as a utility line 650 via an electromagnetic signal 655.

Figure 7:
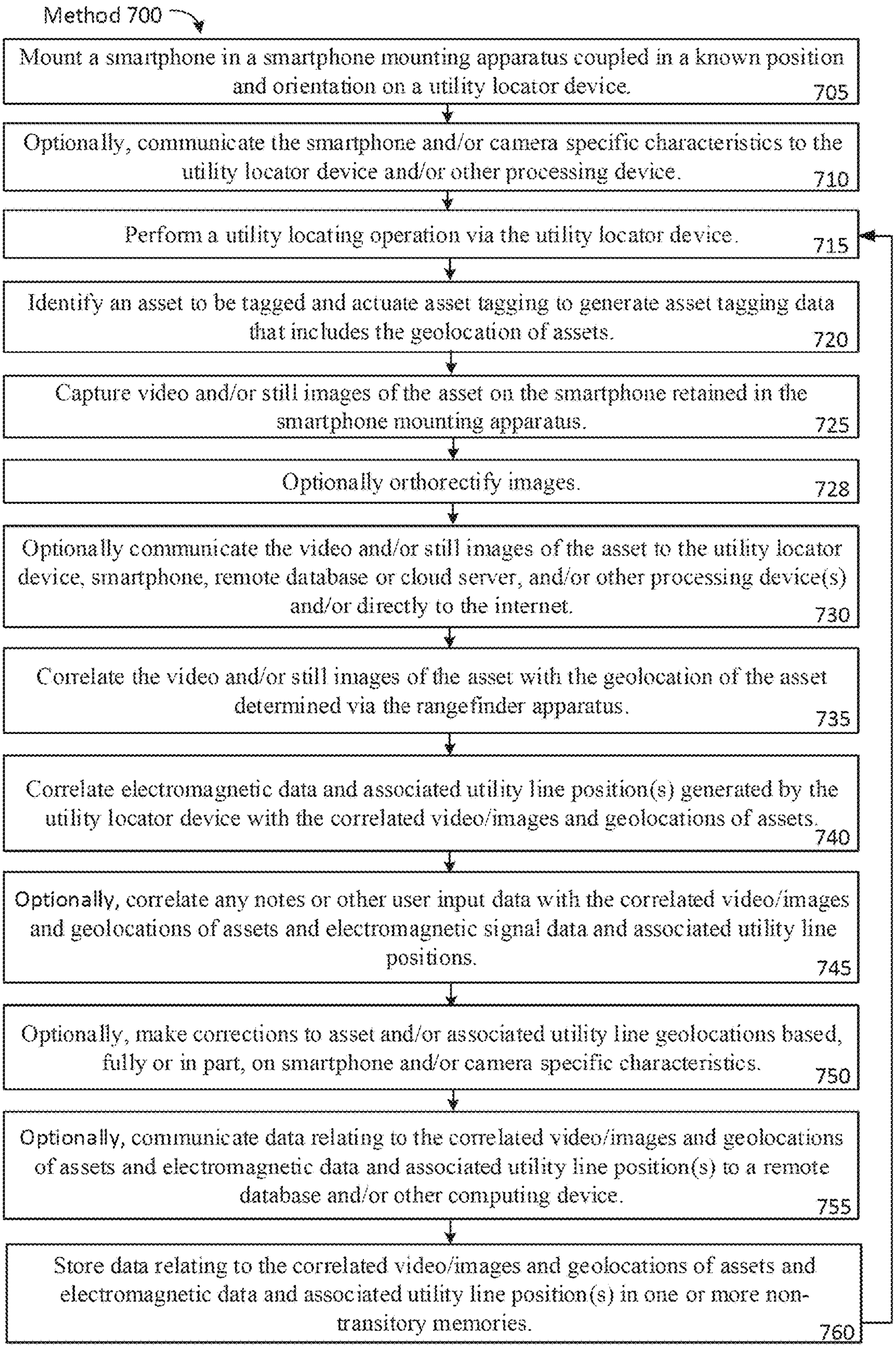
FIG. 7 is an asset tagging method employing a smartphone retained in a smartphone mounting apparatus for tagging assets in the locator environment.

Turning to FIG. 7, an asset tagging method 700 is disclosed employing a smartphone retained in a smartphone mounting apparatus for tagging assets in the locator environment. In a step 705 the method 700 may include mounting a smartphone in a smartphone mounting apparatus coupled in a known position and orientation on a utility locator device. In some embodiments, the smartphone mounting apparatus may be at a fixed position and orientation as illustrated with the smartphone mounting apparatus 120 of FIGS. 1A-1D, the smartphone mapping apparatus 320 of FIGS. 3A and 3B, the smartphone mounting apparatus 520 of FIG. 5, and the smartphone mounting apparatus 620 of FIGS. 6A and 6B. In other embodiments, such as with the smartphone mounting apparatus 420 of FIG. 4, the angle orientation may be adjustable. In such embodiments, the step 705 may include adjusting the angle orientation of the smartphone mounting apparatus so that the frame of view of the camera(s) includes the spot measured by the rangefinder apparatus, determining the angle of orientation the smartphone retained in the smartphone mounting apparatus to which the smartphone mounting apparatus has been adjusted, and communicating the angle orientation information to the utility locator device. For instance, a smartphone having an INS, gyroscopic sensor, accelerometers, and/or like sensors for determining orientation or pose may determine the angle orientation and communicate this information to the utility locator device (e.g., via Bluetooth, Wi-Fi, cellular radio, ISM, a wired connection, or the like).

In an optional step 710, the method may include communicating the smartphone and/or camera specific characteristics to the utility locator device and/or other processing device. For instance, the camera or cameras of a smartphone may have known optical characteristics that may vary from model to model of smartphone. The smartphone and/or camera specific characteristics may be or include a phone model and/or serial number and/or like information that may identify the specific optical characteristics of the particular smartphone. In yet further embodiments, such data may be determined via the metadata of the images and/or video determined by the smartphone camera(s).

In a step 715, the method 700 may include performing a utility locating operation via the utility locator device. For instance, a user may carry the utility locator device through a locate area measuring electromagnetic signals.

In a step 720, the method 700 may include identifying assets to be tagged and actuating asset tagging to generate asset tagging data that includes the geolocation of assets. For instance, the asset may be tagged via a laser rangefinder apparatus. A user may press a button, give a voice command, or otherwise initiated the asset tagging procedure. In such embodiments, the orientation of the smartphone mounting apparatus may capture the laser on the asset in the field of view of the smartphone when installed. In some embodiments, image recognition or artificial intelligence may be used to identify particular objects or attributes in the locate environment for tagging. Likewise, anomalous or particular electromagnetic signal signature patterns measured at the utility locator device may initiate tagging of assets. In some embodiments, the geolocation of the asset may be determined through the known geolocation and orientation/pose data of the utility locator device and/or the connected smartphone. For instance, the utility locator device and/or the smartphone may determine orientation/pose at a position such that the position of an asset may be estimated relative to the utility locator device and/or smartphone. Such a position may be refined or more accurately calculated where the specific optical characteristics of the camera(s) are known (e.g., via the step 710). Further, as the geolocation of the utility locator device and/or smartphone may be determined through GNSS or the like, the geolocation of the asset may be determined.

In a step 725, the method 700 may include capturing video and/or still images of the asset on the smartphone retained in the smartphone mounting apparatus. It should be noted that in some embodiments the camera or cameras may be or include LiDAR or other three-dimensional imaging apparatus to generate a three-dimensional image of an asset. In some embodiments, the step 725 may be automated when the tagging procedure is initiated. In other embodiments, a user may, through the push of a button, providing a voice command, or like input, command the smartphone to capture the images(s) and/or video of the asset. In other embodiments, images may instead or additionally be generated via one or more cameras disposed in the utility locator device (e.g., the cameras 1006 of the utility locator device 1000 illustrated in FIGS. 10A and 10B). In such embodiments, the images may be communicated to a smartphone, which may or may not be in a smartphone mounting apparatus, for processing and carrying out the steps of the method 700. In an optional step 728, the images may be orthorectified. The orthorectification of images may occur in real-time or near real-time.

In an optional step 730, the method 700 may include communicating the video and/or still images of the asset to the utility locator device, smartphone, remote database or cloud server, and/or other processing device(s) and/or directly to the internet. For instance, the video and/or still images of the asset may be communicated to the utility locator device from the smartphone via Bluetooth, Wi-Fi, cellular radio, ISM, a wired connection, or the like. In such embodiments, processing of images and other data may occur in the utility locator device. In other embodiments, such processing may occur in the smartphone. Further, in some embodiments such as with the utility locator device 1000 of FIGS. 10A and 10B, images may instead be generated via one or more cameras disposed in a utility locator device and communicated to a smartphone for processing. In even further embodiments, such processing may occur in a remote database or cloud computing system and/or other system device. In other embodiments, images and electromagnetic data maybe communicated to a remote database and/or other computing device(s) (e.g., cloud server or the like) and/or other system device (e.g., transmitter device, base station, camera control unit, pipe inspection camera, camera reel, and/or the like) for processing.

In a step 735, the method 700 may include correlating the video and/or still images of the asset with the geolocation of the asset. In a step 740, the method 700 may include correlating electromagnetic data and associated utility line position(s) generated by the utility locator device with the correlated video/images and geolocations of assets.

In a step 745, the method 700 may include correlating any notes or other user input data with the correlated video/images and geolocations of assets and electromagnetic signal data and associated utility line positions. For instance, a user may type or provide a voice annotation to the tagged asset. Such voice annotated tagged assets may be U.S. patent application Ser. No. 18/354,926, filed Jul. 19, 2023, entitled NATURAL VOICE UTILITY ASSET ANNOTATION SYSTEM; and/or other devices disclosed in the incorporated patents and applications. The content of each of these applications is incorporated by reference herein in its entirety.

In an optional step 750, corrections to the asset and/or associated utility line geolocations may be made based, fully or in part, on smartphone and/or camera specific characteristics. For instance, knowing the specific optical characteristics associated with each image of an asset may, alone or in tandem with data from other sources (e.g., GNSS and/or INS in the utility locator device and/or smartphone or the like), to determine a more accurate position/geolocation of the asset and/or utility line(s).

In a step 755, the method 700 may include communicating data relating to the correlated video/images and geolocations of assets and electromagnetic data and associated utility line position(s) to a remote database and/or other computing device. For instance, the video and/or still images of the asset and corresponding asset tagging data as well as mapped utility lines may be communicated to a cloud computer and/or other computing device and/or other system device(s). In a step 760, the method 700 may include storing data relating to the correlated video/images and geolocations of assets and electromagnetic data and associated utility line position(s) in one or more non-transitory memories. The method 700 may optionally repeat at step 715 tagging other assets in the locating environment until the locating operation has been completed.

Figure 8A:
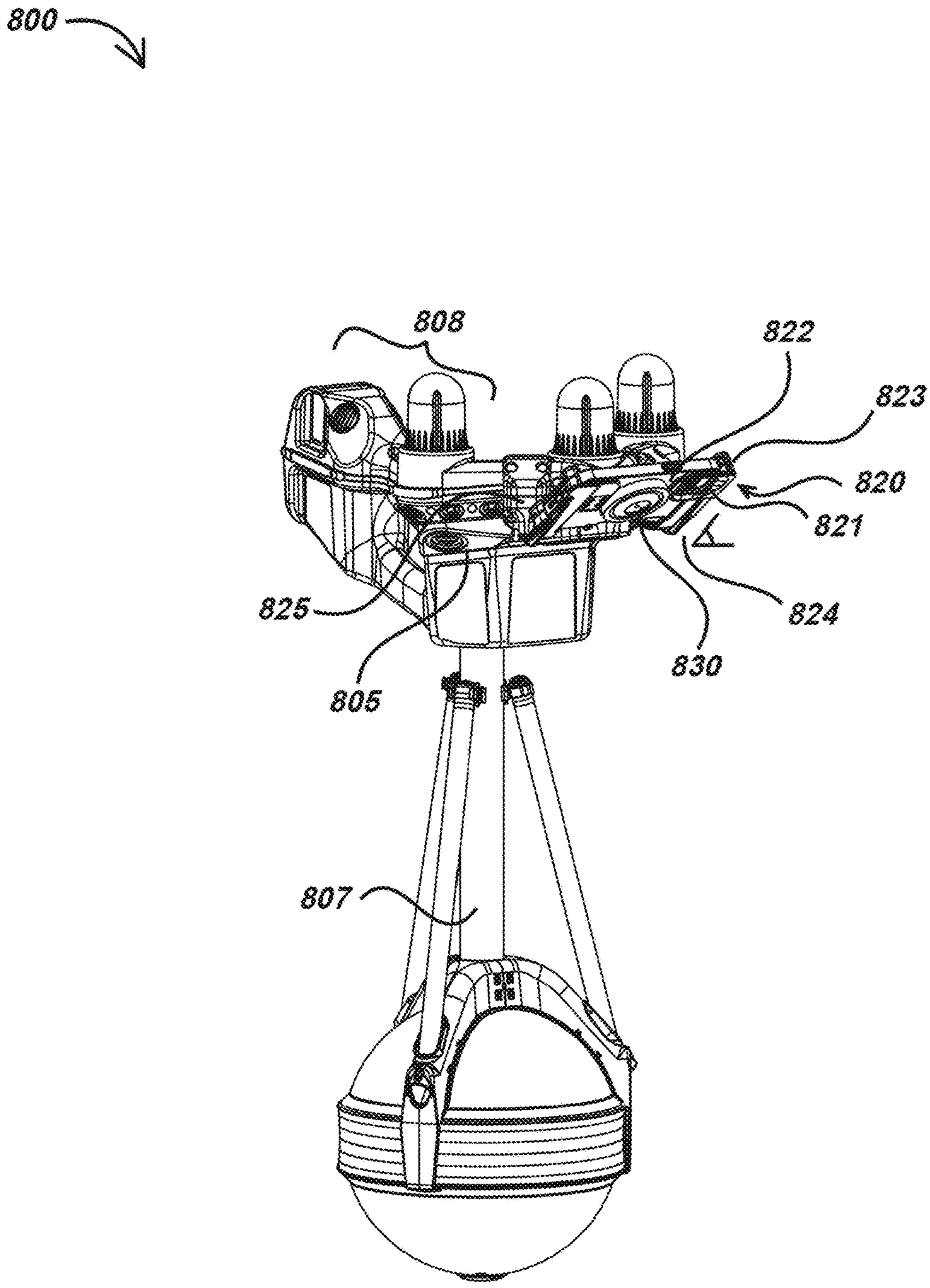
FIGS. 8A and 8B are illustrations of another smartphone mounting apparatus mounting to the head of a utility locator device.
Figure 8B:
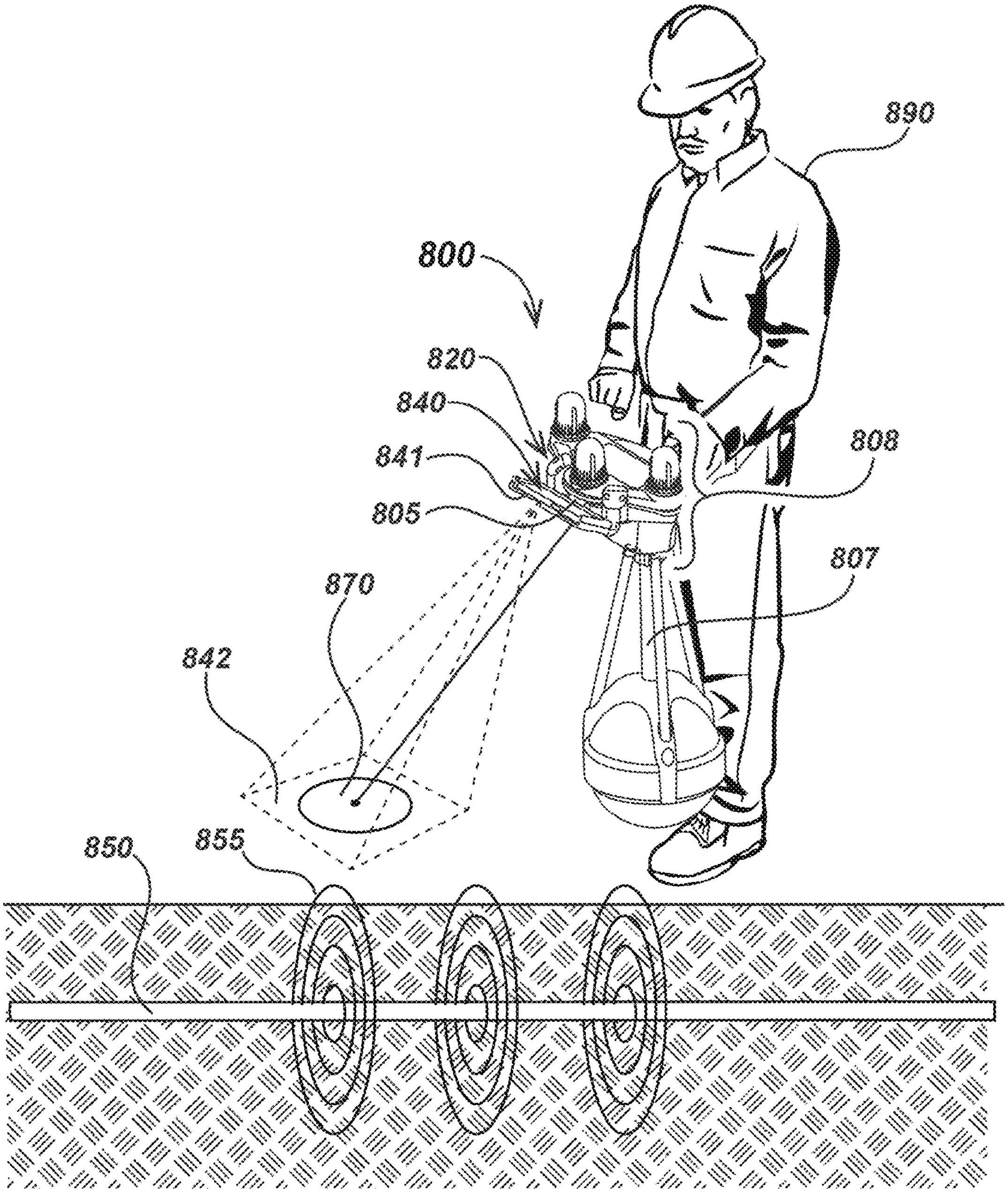
Figure 8C:
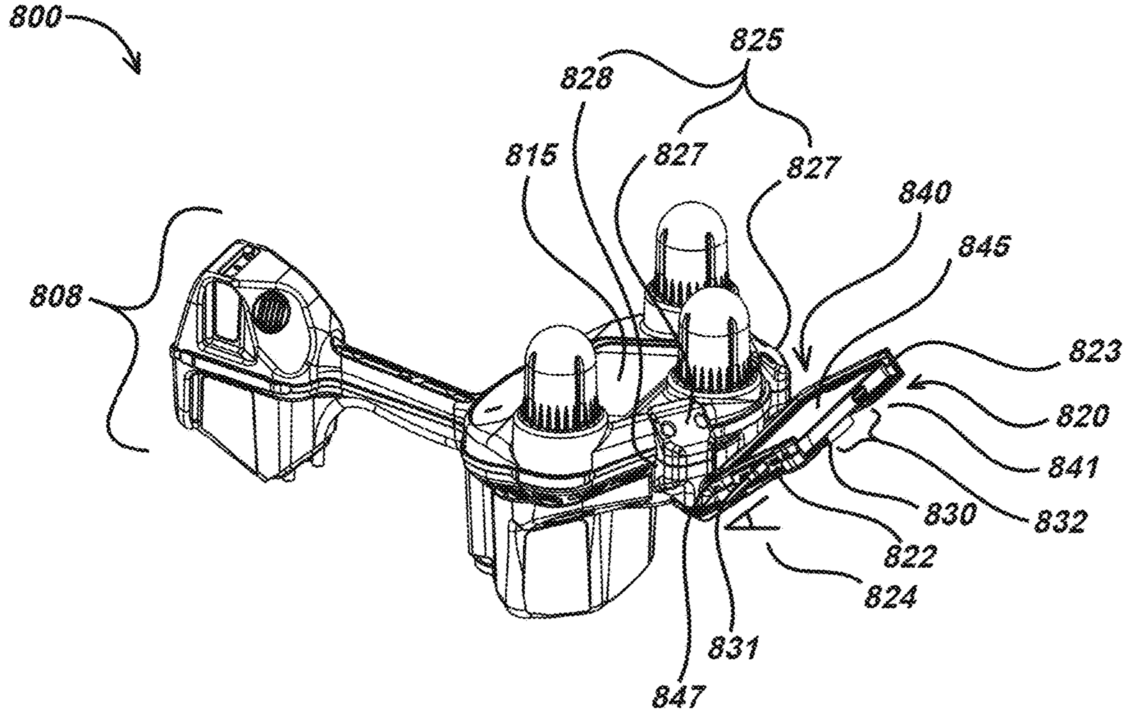
FIGS. 8C and 8D are detailed illustrations of smartphone mounting apparatus mounting to the head of a utility locator device from FIGS. 8A and 8B.
Figure 8D:
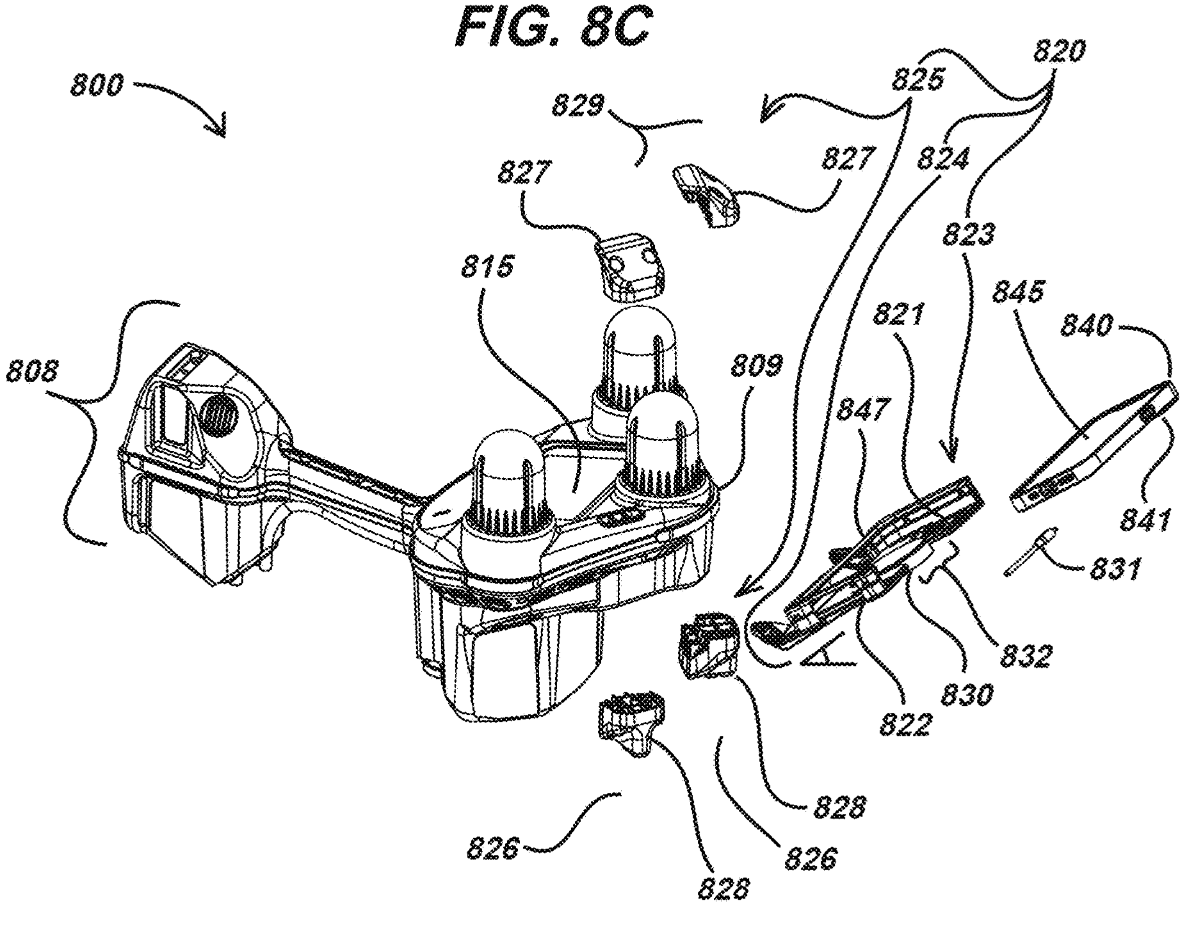

Turning to FIGS. 8A and 8B, a utility locator device 800 is illustrated having a smartphone mounting apparatus 820 in keeping with the current disclosure. The utility locator device 800 and the smartphone mounting apparatus 820 may be or share aspects with the utility locator device 100 and the smartphone mounting apparatus 120 respectively as disclosed in FIGS. 1A-1D wherein the smartphone mounting apparatus 820 is mounted horizontally to a head 808 on the utility locator device 800 rather than along a mast 807. The smartphone mounting apparatus 820 may further include an opening 821 (FIGS. 8A, 8C, and 8D) such that a retainer element 823 (FIGS. 8A, 8C, and 8D) configured to selectively retain the smartphone 840 may not obstruct a field of view 842 (FIG. 8B) of one or more cameras 841 on a smartphone 840. For instance, the retainer element 823 (FIGS. 8A, 8C, and 8D) may include one or more magnets 846 (FIGS. 8A, 8C, and 8D) to magnetically retain the smartphone 840 in addition to a wireless charging mechanism 830 (FIGS. 8A, 8C, and 8D). The smartphone mounting apparatus 820 may likewise include a notch 822 (FIGS. 8A, 8C, and 8D) such that when installed the smartphone mounting apparatus 820 the notch 822 (FIGS. 8A, 8C, and 8D) may not block access to the data and charging port on the smartphone 840 allowing the smartphone 840 to optionally be charged and/or communicate data from the utility locator device 800 via a wired connector 831 (FIGS. 8C and 8D). The smartphone mounting apparatus 820 may further include an angle orientation 824 orienting a smartphone at an angle such that the field of view 842 (FIG. 8B) of the camera(s) 841 of the retained smartphone 840 may capture asset 870 (FIG. 8B) on the ground. It should be noted that in some embodiments the camera or cameras may be or include LiDAR or other three-dimensional imaging apparatus to generate a three-dimensional image of an asset such as the asset 870 (FIG. 8B). Further, the smartphone mounting apparatus 820 may include a mounting element 825 allowing the smartphone mounting apparatus 820 to be secured to the head 808 of utility locator device 800.

Turning to FIG. 8B, the utility locator device 800 having the smartphone 840 retained in the smartphone mounting apparatus 820 is illustrated being held by a user 890. As illustrated, the user 890 may view and access the user interface of the smartphone 840 while holding the utility locator device 800 as intended. Having the smartphone 840 accessible to the user 890 holding the user interface device 800 may readily facilitate tagging of assets such as the asset 870 tagged via a rangefinder apparatus 805 in the utility locator device 800 while also capturing the asset 870 in the field of view 842 of the cameras 841 in generating images and/or video of the asset 870 and simultaneously determining and mapping one or more utility lines via electromagnetic signals such as a utility line 850 via an electromagnetic signal 855. It should be noted, that in some embodiment such as with the utility locator device 800 and the smartphone 840, user input for either device may control aspects of the other device. For instance, the user 890 may input on the utility locator device 800 to control aspects of the smartphone 840 and, likewise the user 890 may input on the smartphone 840 to control aspects of the utility locator device 800.

Turning to FIGS. 8C and 8D, the smartphone mounting apparatus 820 is shown in greater detail in relation to the head 808 on the utility locator device 800. As illustrated, the mounting element 825 may include a top mounting half 827 and a bottom mounting half 828 that may couple together in assembly view a series of screws 829 (FIG. 8D) and be secured to the head 808 of the utility locator device 800 by the mounting element 825 grasping onto a lip 809 on the head 808 of the utility locator device 800. Further, the smartphone 840 may slide into the retainer element 823 and be held therein via the magnets 846 and a lip elements 847 holding along the edges of the smartphone 840.

Still referring to FIGS. 8C and 8D, the utility locator device 800 may have a display 815 and the smartphone 840 may have a display 845 that may display various aspects involved with locating and mapping utility lines (e.g., the utility line 850 of FIG. 8B) as well as displaying images and video of assets (e.g., the asset 870 of FIG. 8B) tagged in the locating environment. As such, the display 815 of the utility locator device 800 and the display 845 of the smartphone 840 may share displaying various information and data. Further, a user may input on either utility locator device 800 and/or the smartphone 840 to control aspects of the other. For instance, the display 815 of the utility locator device 800 and the display 845 of the smartphone 840 may be touch screens and thus a user (e.g., the user 890 of FIG. 8B) may input on the utility locator device 800 to control aspects of the smartphone 840 and, likewise, the user (e.g., the user 890 of FIG. 8B) may input on the smartphone 840 to control aspects of the utility locator device 800.

Still referring to FIGS. 8C and 8D, the retainer element 823 may be exchanged for other retainer elements of different dimensions to accommodate other sizes of smartphones of different makes which may be from different manufacturers. For instance, a series of bolts 826 (FIG. 8D) may be removed to decouple the retainer element 823 from the mounting element 825 further allowing a different retainer element generally having different dimensions of a different smartphone to be installed and couple to the bottom mounting half 828 of the mounting element 825. In other embodiments, hand bolts, snaps, keying mechanisms, and/or other coupling mechanisms may be used to couple and decouple a retaining element to a mounting element in a smartphone mounting apparatus in keeping with the present invention. In embodiments, a retainer element such as with the retainer element 823 of the smartphone mounting apparatus 820 may include a groove 832 allowing the wireless charging mechanism 830 to pass through the retainer element 823 in charging a smartphone 840. The groove 832 may allow the wireless charging mechanism 830 to optionally be reused in charging different smartphones in conjunction another different retainer element having a similar pass through groove.

Figure 9:
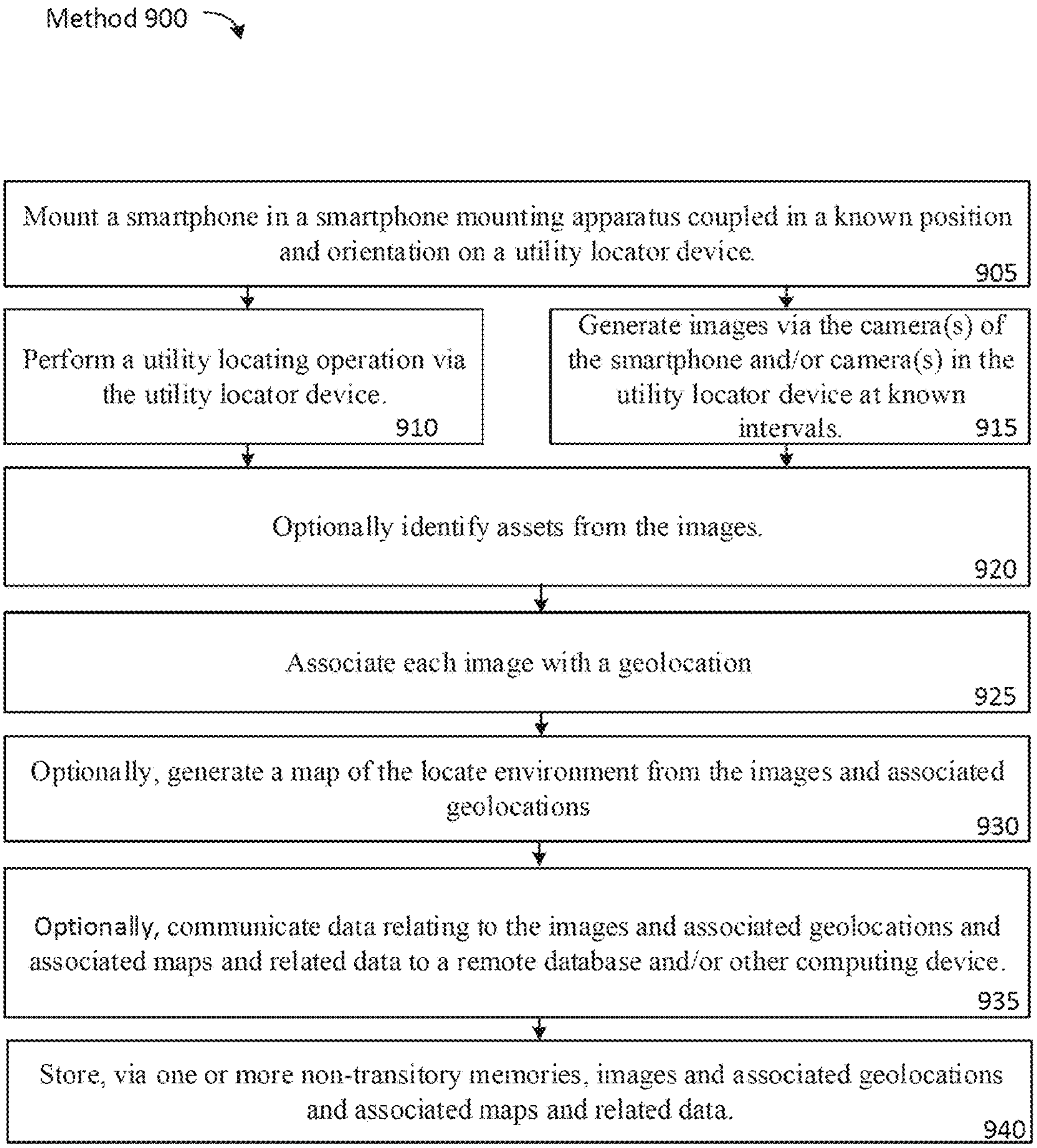
FIG. 9 is a flow chart disclosing a locate environment scanning method employing a smartphone retained in a smartphone mounting apparatus.

Turning to FIG. 9, a locate environment scanning method 900 employing a smartphone mounting apparatus is disclosed. In a step 905, the method 900 may include mounting a smartphone in a smartphone mounting apparatus secured in a known position and orientation on a utility locator device. In a step 910, the method 900 may include performing a utility locating operation with the utility locator device. In a parallel step 915, the method 900 may include generating images via the camera(s) of the smartphone and/or camera(s) in the utility locator device at known intervals. For instance, the interval may be based on timing or in change of position/geolocation. It should be noted, in embodiments where images are generated at the utility locator device, such images may be communicated to the smartphone for processing and the method 900 may be carried out via the smartphone. Likewise, in some embodiments where images are generated at the smartphone, such images may be communicated to the utility locator device for processing and the method 900 may be carried out via the utility locator device. Further, the images may be communicated to a remote database and/or other computing device (s) (e.g., cloud server or the like) and/or other system device(s) (e.g., transmitter device, base station, camera control unit, pipe inspection camera, camera reel, and/or the like) for processing. In an optional step 920 subsequent to steps 910 and 915, assets may be identified from the images. In some embodiments, the images may be three-dimensional (e.g., via LiDAR or other three-dimensional imaging system). In a step 925, the method may include associating each image with a geolocation of the image determined via the smartphone or utility locator device. In an optional step 930, the method 900 may include generating a map of the locate environment from the images and associated geolocations. Such a map may include the positions/geolocations of utility lines. In some embodiments, three-dimensional images may be used to generate a topographical map of the locate environment that may include utility line positions/geolocations. In an optional step 935, the method 900 may include communicating data relating to the images and associated geolocations and associated maps and related data to a remote database and/or other computing device. In a step 940, the method 900 may include storing, via one or more non-transitory memories, images and associated geolocations and associated maps and related data.

In some embodiments, the utility locator device may include one or more cameras and analyzing and processing of images may be carried out on a smartphone. Likewise, analyzing and processing of images may instead or additionally occur on a remote database and/or other computing device(s) (e.g., cloud server or the like) and/or other system device (e.g., laptops, tablets, smartphones, remote servers, signal transmitters, base stations, other locating specific devices and the like).

Figure 10A:
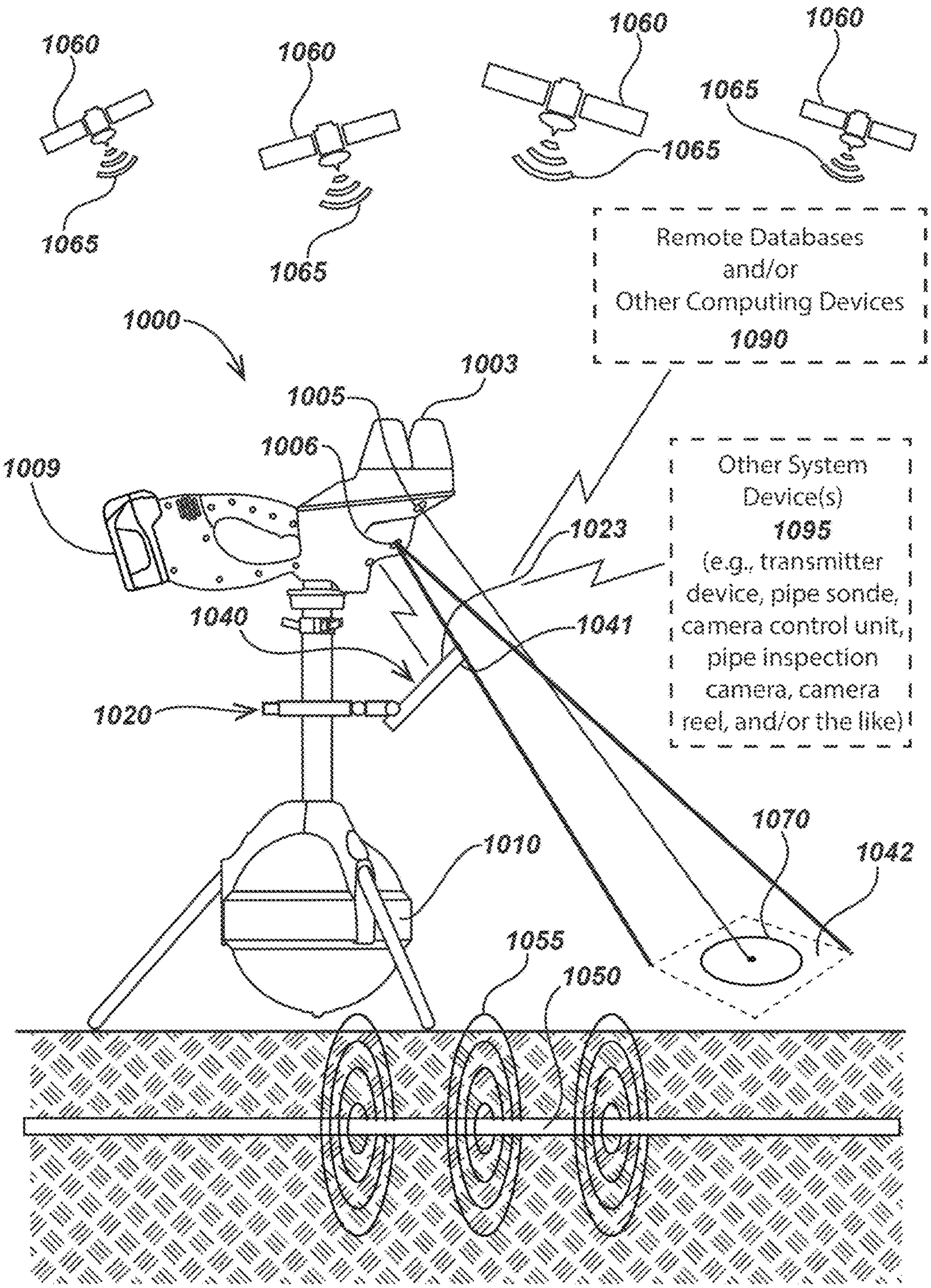
FIG. 10A is an illustration of another utility locator device embodiment having a smartphone mounting apparatus retaining a smartphone.
Figure 10B:
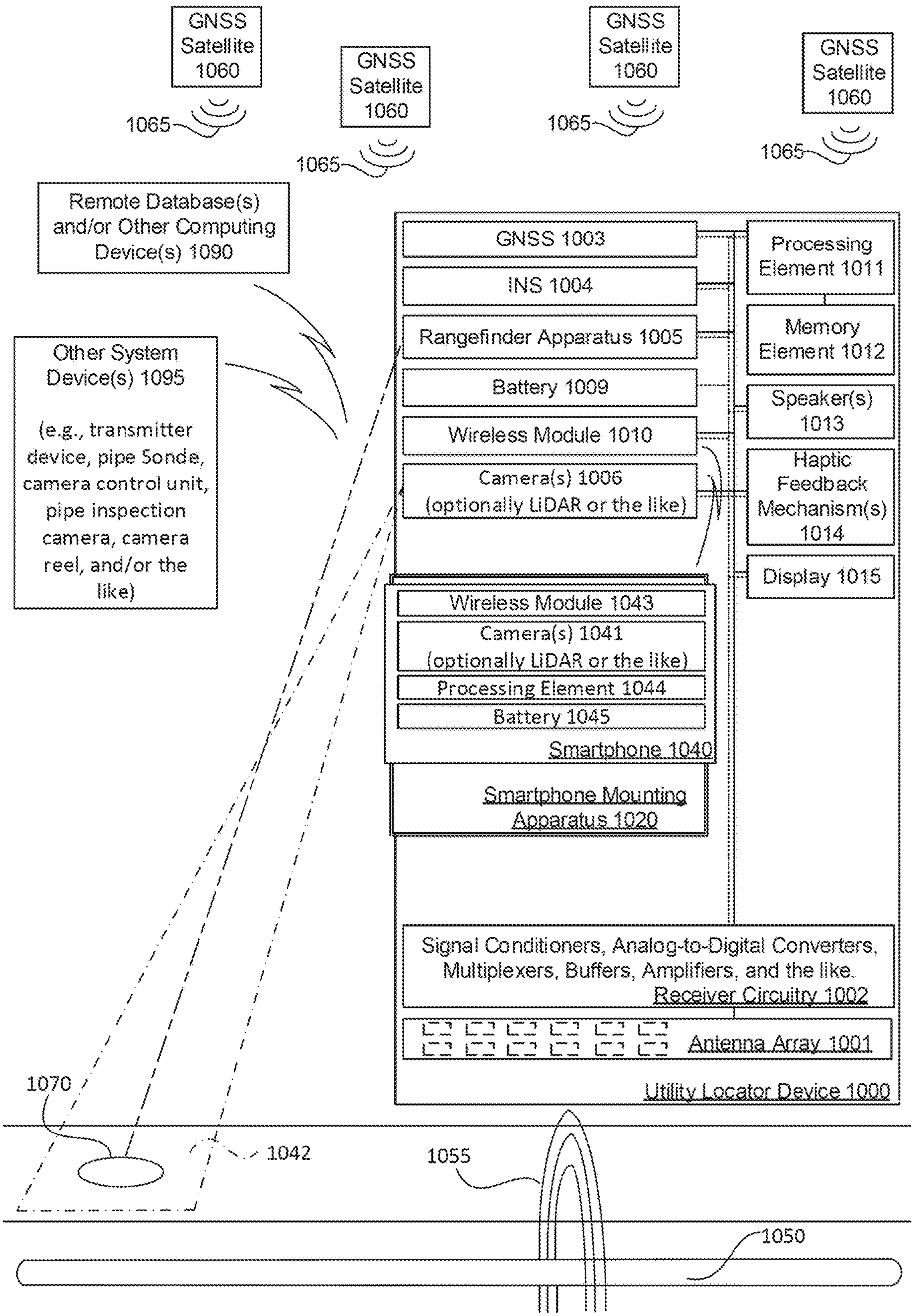
FIG. 10B is a diagram of the utility locator device embodiment having a smartphone mounting apparatus and smartphone from FIG. 10A.

Turning to FIGS. 10A and 10B, a utility locator device 1000 is illustrated which may optionally include a smartphone mounting apparatus 1020 of the present invention to selectively retain a smartphone 1040. The utility locator device 1000 may have an antenna array 1001 and an associated receiver 1002 (FIG. 10B) to measure electromagnetic signals across a range of frequencies and determine the position of utility lines relative to the utility locator device 1000, such as a signal 1055 emitted by a utility line 1050. The utility locator device 1000 may be or share aspects with the utility locator device 100 of FIGS. 1A, 1B, 1C, and 1D and/or the utility locator devices disclosed in U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS; U.S. Pat. No. D922,885, issued Jun. 22, 2021, entitled BURIED OBJECT LOCATOR; U.S. Pat. No. 11,196,181, issued Dec. 7, 2021, entitled LOW COST, HIGH PERFORMANCE SIGNAL PROCESSING IN A MAGNETIC-FIELD SENSING BURIED UTILITY LOCATOR SYSTEM; and/or others disclosed in the incorporated patents and applications. The content of each of these applications is incorporated by reference herein in its entirety.

The utility locator device 1000 may further determine geolocations and orientation/pose at those geolocations, referred to herein as "geospatial data," in order to further map buried utility lines such as the utility line 1050. For instance, the utility locator device 1000 may include one or more GNSS 1003 to receive navigation signals 1065 from a plurality of GNSS satellites 1060 in determining geolocations of the utility locator device 1000. Further, the utility locator device 1000 may include an inertial navigation system (INS) 1004 (FIG. 10B) and/or other apparatus to determine the position and orientation or pose of the utility locator device 1000 in the world frame. Such position and orientation/pose determining apparatus may be or share aspects with those disclosed in U.S. Pat. No. 9,081,109, issued Jul. 14, 2015, entitled GROUND-TRACKING DEVICES FOR USE WITH A MAPPING LOCATOR; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,784,837, issued Oct. 10, 2017, entitled OPTICAL GROUND TRACKING APPARATUS, SYSTEMS, AND METHODS; U.S. patent application Ser. No. 15/811,361, filed Nov. 13, 2017, entitled OPTICAL GROUND TRACKING APPARATUS, SYSTEMS, AND METHODS; U.S. Pat. No. 9,928,613, issued Mar. 27, 2018, entitled GROUND TRACKING APPARATUS, SYSTEMS, AND METHODS; U.S. patent application Ser. No. 16/430,225, filed Jun. 3, 2019, entitled MAGNETIC SENSING GROUND TRACKING DEVICES AND METHODS; U.S. patent application Ser. No. 17/502,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/728,949, filed Apr. 25, 2022, entitled BURIED UTILITY LOCATOR GROUND TRACKING APPARATUS, SYSTEMS, AND METHODS; U.S. Pat. No. 11,428,814, issued Aug. 30, 2022, entitled OPTICAL GROUND TRACKING APPARATUS, SYSTEMS, AND METHODS FOR USE WITH BURIED OBJECT UTILITY LOCATORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,953,643, issued Apr. 9, 2024, entitled MAP GENERATION BASED ON UTILITY LINE POSITION AND ORIENTATION ESTIMATES; U.S. Pat. No. 11,988,755, issued May 21, 2024, entitled UTILITY LOCATING DEVICES EMPLOYING MULTIPLE SPACED APART GNSS ANTENNAS; and/or others disclosed in the incorporated patents and applications. The content of each of these applications is incorporated by reference herein in its entirety.

Further, the utility locator device 1000 may include a rangefinder apparatus 1005 for measuring distances to assets/objects from the utility locator device 1000 and/or tagging assets in the locating environment such as an asset 1070. The rangefinder apparatus 1005 may be or share aspects with U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled TRACKED DISTANCE MEASURING DEVICES, SYSTEMS, AND METHODS; and/or other devices disclosed in the incorporated patents and applications. The content of each of these applications is incorporated by reference herein in its entirety.

Turning to FIG. 10B, the smartphone 1040 and the utility locator device 100 may wireless communicate data (e.g., via wireless module which may be or include Bluetooth, Wi-Fi, cellular radio, ISM radio, or the like). For instance, the smartphone 1040 may include a wireless module 1043 to transmit and receive data in communicating with a wireless module 1010 in the utility locator device. Such data may be or include images and/or videos of tagged assets 1070 and/or other images of the locate environment which may be generated via one or more cameras 1006 in the utility locator device 1000. Likewise, such data may be related to mapped utility lines and/or data from other connected devices and apparatus. It should also be noted that such data may be wirelessly communicated from the utility locator device 1000 and/or the smartphone 1400 with one or more remote databases and/or other computing devices 1090 (e.g., cloud servers, other system devices or the like). It should also be noted that in some embodiments the camera(s) 1070 may be or include LiDAR or other three-dimensional imaging apparatus to generate a three-dimensional image of objects or assets such as the asset 1070.

Still referring to FIG. 10B, data generated by the utility locator device 1000 and the connected smartphone 1040 may be communicated with one or more other system devices 1095 (e.g., transmitter device, pipe Sonde, camera control unit, pipe inspection camera, camera reel, and/or the like) and, likewise, data generated via the other system devices 1095 may be communicated with the utility locator device 1000 and the smartphone 1040. For instance, in some embodiments, the smartphone 1040 or utility locator device 1000 might turn a pipe Sonde on or off on a camera system. Likewise, the smartphone 1040 or utility locator device 1000 may receive video or images from a pipe inspection camera or camera reel or camera control unit or other connected system device 1095 for display on the smartphone 1040 or utility locator device 1000.

The utility locator device 1000 is shown having a dodecahedral antenna array 1001 and a receiver circuitry 1002 which may, for example, include one or more buffers, amplifiers, signal conditioners, analog-to-digital (A/D) converters, multiplexers, and the like to provide filtering functionality, signal conditioning, or the like for outputs to a processing element 1011 having one or more processor to determine the emission positions of a plurality of electromagnetic signals, such as the electromagnetic signal 1055, relative to the utility locator device 1000. The processing element 1011 may further couple with a memory element 1012 having one or more non-transitory memories for the storage of data such as that relating to mapped buried utility lines, tagged assets, photographs/video of tagged assets, images of the locate environment, and the like.

The utility locator device 1000 may further include one or more GNSS 1003 and INS 1004 (e.g., one or more accelerometers, gyroscopes, magnetometers, and the like) in determining geolocations and positions or poses at the geolocations. Such positioning data may further be used in mapping utility lines emitting electromagnetic signals such as the utility line 1050 emitting the signal 1055. Likewise, as disclosed with the method 1100 of FIG. 11, assets or other objects identified in images of the locate environment generated by cameras (e.g., the cameras 141 of the smartphone 140 and/or the cameras 1006 of the utility locator device 1000 illustrated in FIGS. 10A and 10B) may be correlated with like features in pre-existing maps in mapping electromagnetic signals and utility lines.

Still referring to FIG. 10B, the rangefinder apparatus 1005 may measure distances to assets such as the asset 1070 and determine and map the geolocation thereof. Such position data of tagged assets may be associated with images/video of the asset 1070 generated device via the processing element 1011 in the utility locator device 1000 and/or a processing element 1044 in the smartphone 1400 and/or a processing element in a remote server and/or remote device(s) 1090 (e.g., cloud servers, other system devices, or the like) and/or processors in other connected devices.

A wireless module 1010 (e.g., Bluetooth, Wi-Fi, cellular radio, ISM radio, or the like) may be included in the utility locator device 1000 to communicate data between the smartphone 1040 (also having a wireless module 1043) and the utility locator device 1000. For instance, the utility locator device 1000 may generate images of the locating environment and/or the asset 1070 and communicate such data to the smartphone 1040 for analyzing and processing of images (e.g., via the method 1100 of FIG. 11). Likewise, electromagnetic signal data, geospatial data, mapping data, and the like may be communicated to the smartphone 1040 and/or the wireless module 1010 of the utility locator device 1000 and the wireless module 1043 of the smartphone 1040 and/or one or more remote databases and/or other computing device(s) 1090 (e.g., cloud servers, other system devices, or the like) and/or other system devices 1095 (e.g., laptops, tablets, smartphones, remote servers, signal transmitters, base stations, other locating specific devices and the like).

In some embodiments (e.g., the utility locator device 1000 of FIGS. 10A and 10B), one or more cameras disposed in a utility locator device may generate images of the locate environment that may further be communicated to a smartphone for analysis and processing. For instance, the smartphone may receive images, electromagnetic data, geospatial data, and/or other data and tag asset (e.g., via method 700 of FIG. 7), identify assets present in the locate environment and determine utility line type (e.g., via method 1100 of FIG. 11), determine utility line types (e.g., via method 1100 of FIG. 11), mapping of electromagnetic signals and utility lines (e.g., via method 1100 of FIG. 11), and other processing/analysis. It should be noted that in such embodiments that a smartphone may or may not be held in smartphone mounting apparatus of the present disclosure.

Still referring to FIG. 10B, the battery 1009 of the utility locator device 1000 may distribute electrical power to the various powered element of the utility locator device 1000. The battery 1009 may be or share aspects with those disclosed in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. Pat. No. 11,171,369, issued Nov. 9, 2021, entitled MODULAR BATTERY PACK APPARATUS, SYSTEMS, AND METHODS; U.S. Pat. No. 11,894,707, issued Feb. 6, 2024, entitled RECHARGEABLE BATTERY PACK ONBOARD CHARGE STATE INDICATION METHODS AND APPARATUS; and/or other devices disclosed in the incorporated patents and applications. The content of each of these applications is incorporated by reference herein in its entirety.

Still referring to FIG. 10B, the utility locator device 1000 may include one or more elements to communicate information to a user information regarding positions and depths of buried utility lines, tagged assets, other device or system information, and the like. For instance, the utility locator device 1000 may include one or more speakers 1013, haptic feedback mechanisms 1014, as well as a display 1015 and the like. In some embodiments, the image and/or video of tagged assets may be shown on the display 1015.

Figure 11:
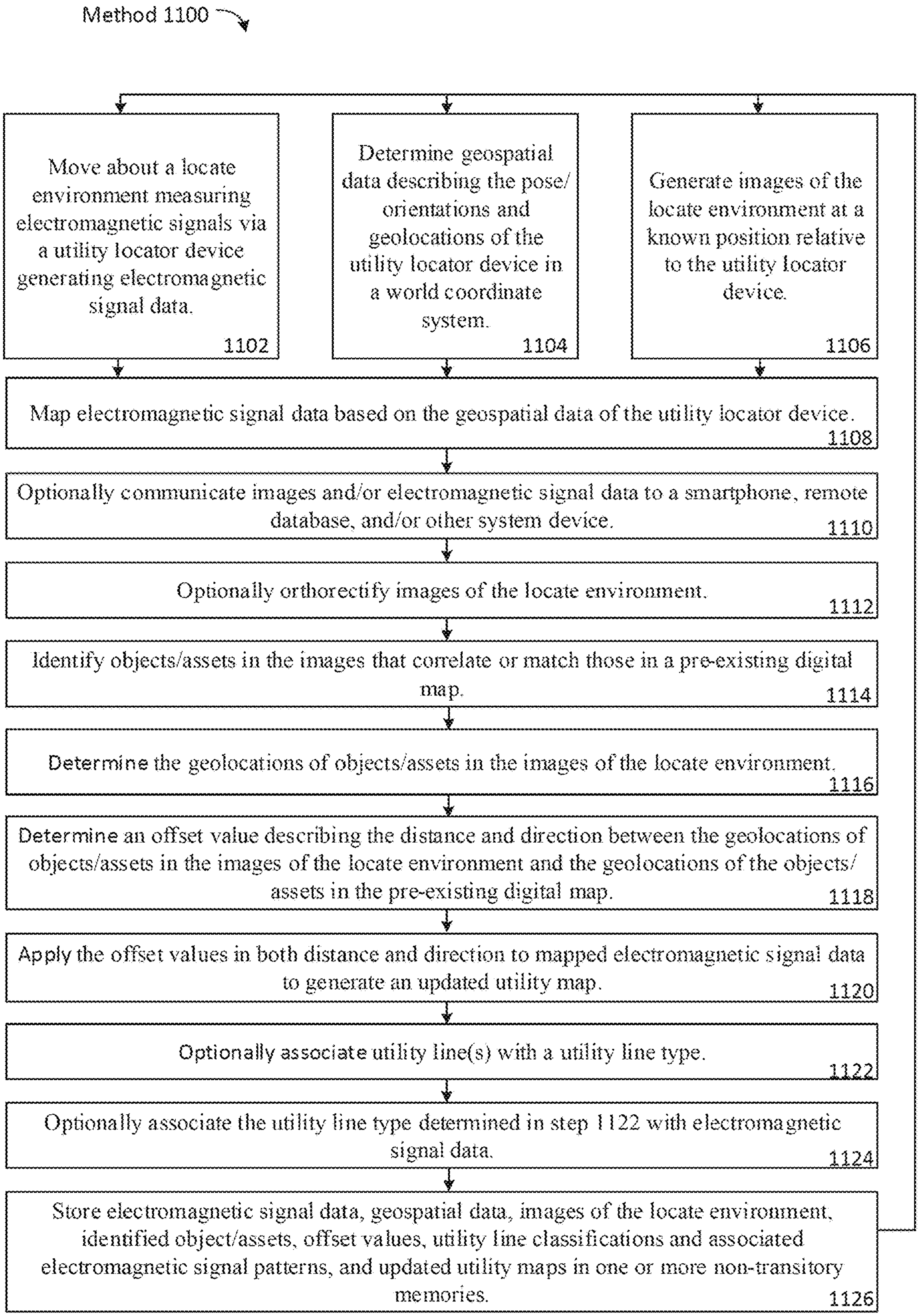
FIG. 11 is a utility line mapping method.

Turning to FIG. 11, a mapping method 1100 is disclosed. In a step 1102, the method 1100 may include moving about a locate environment measuring electromagnetic signals via a utility locator device generating electromagnetic signal data. In a parallel step 1104, the method 1100 may include determining geospatial data describing the pose/orientations and geolocations of the utility locator device in a world coordinate system. In another parallel step 1106, the method 1100 may include generating images of the locate environment at a known position relative to the utility locator device. In step 1108 subsequent to the steps 1102, 1104, and 1106, the method 1100 may include mapping electromagnetic signal data based on the geospatial data of the utility locator device. In an optional step 1110, the method 1100 may include communicating images and/or electromagnetic signal data to a smartphone, remote database, and/or other system device. For instance, such data and images generated via the utility locator device may be analyzed and processed and/or stored via one or more wirelessly connected devices. In an optional step 1112, images may be orthorectified. The orthorectification of images may occur in real-time or near real-time. In a step 1114, the method 1100 may include identifying objects/assets in the images that correlate or match those in a pre-existing digital map. For instance, image recognition or artificial intelligence or like techniques may be used to identify particular assets or objects in images of the locate environment. In a step 1116, the method 1100 may include determining the geolocations of objects/assets in the images of the locate environment. For instance, rangefinder data and geospatial data determined at the utility locator device may be used to determine the position of the assets/objects in the world frame. In a step 1118, the method 1100 may include determining an offset value describing the distance and direction between the geolocations of objects/assets in the images of the locate environment and the geolocations of the objects/assets in the pre-existing digital map. Such an offset value is further illustrated as the offset value 1224 in FIG. 1200. In a step 1120, the method 1100 may include applying the offset values in both distance and direction to mapped electromagnetic signal data to generate an updated utility map. In an optional step 1122, the method 1100 may include associating utility line(s) with a utility line type (e.g., gas, water, sewer, power, telecommunications, and the like). For instance, the step 1122 may utilize image recognition or like techniques to determine information from the locate environment images to determine that a utility line might be classified as a utility line type. Likewise, user input may be used to classify a utility line as being a particular utility type. In another optional step 1124, the method 1100 may include associating the utility line type determined in step 1122 with electromagnetic signal data. For instance, patterns in the electromagnetic signal data (e.g., patterns in the measured frequencies, harmonic frequencies, amplitude, phases, and the like) may be identified and used to further identify other utility lines of the same type. In a step 1124, the method 1100 may include storing electromagnetic signal data, geospatial data, images of the locate environment, identified object/assets, offset values, utility line classifications and associated electromagnetic signal patterns, and updated utility maps in one or more non-transitory memories. Such data may be stored in the utility locator device, smartphone (which may or may not be held in a smartphone mounting apparatus), a remote database and/or other computing device(s) (e.g., cloud server or the like) and/or other system device (e.g., transmitter device, base station, camera control unit, pipe inspection camera, camera reel, and/or the like).

Figure 12:
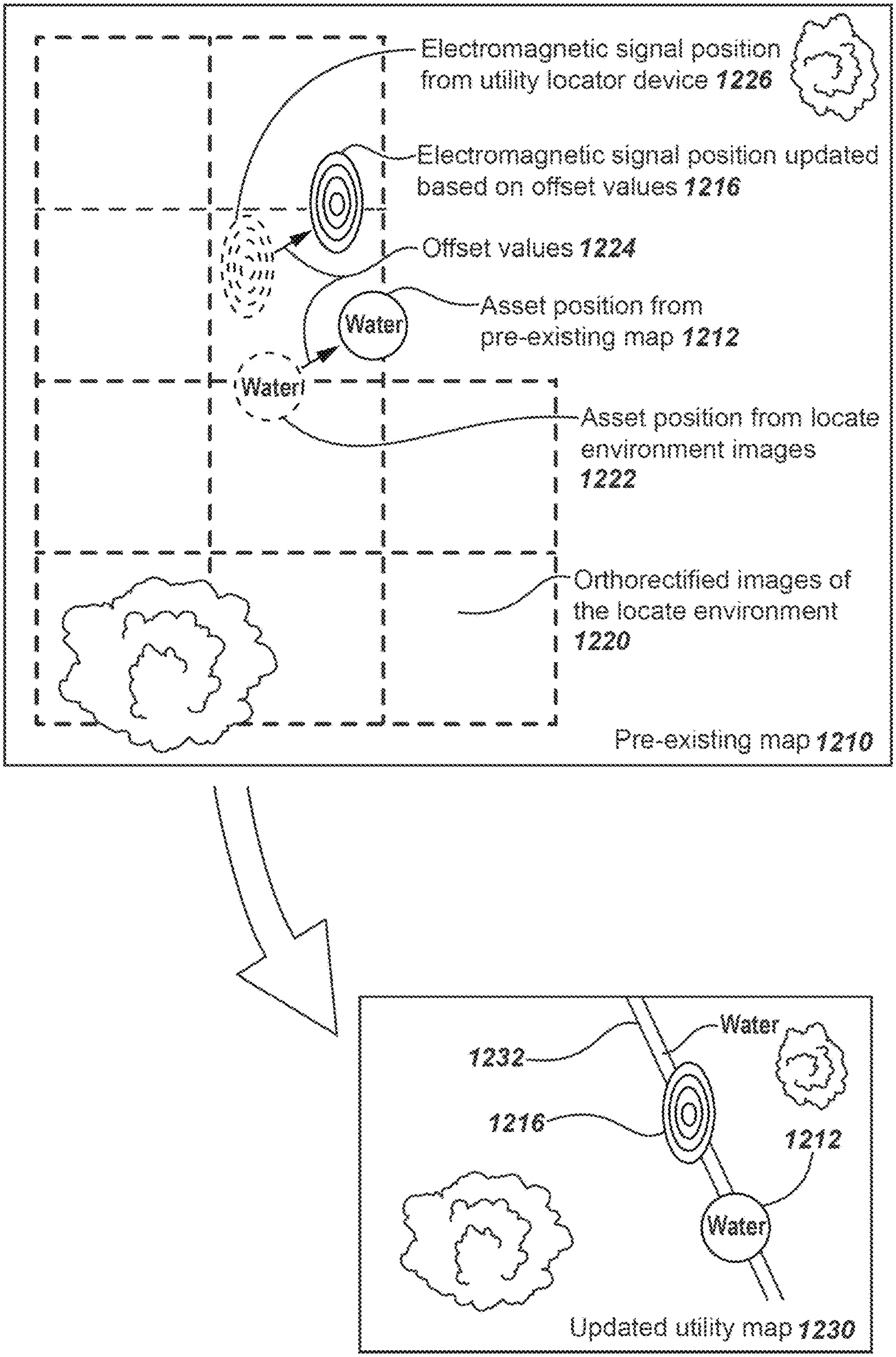
FIG. 12 is an illustration utility line mapping via the method of FIG. 11.

Turning to FIG. 12, a pre-existing map 1210 is illustrated having an asset at an asset position from the pre-existing map 1212. During a locating procedure, a utility locator device and/or smartphone disposed in a smartphone mounting apparatus may generate images of the locate environment which may be orthorectified images of the locate environment 1220. An asset position from locate environment images 1222 may be determined using geospatial data and asset tagging/rangefinder data which may further be matched with an asset position from the pre-existing map 1212. An offset value 1224 may be determined in both distance and direction between the asset position from locate environment images 1222 and the asset position from the pre-existing map 1212. Such an offset value may be applied to electromagnetic position from the utility locator device 1226 to determine electromagnetic signal position updated based on the offset value 1216. The electromagnetic signal position updated based on the offset value 1216 may be used to generate an updated utility map 1230 that includes one or more utility lines, such as a utility line 1232 associated with the electromagnetic signal data (e.g., the electromagnetic signal position updated based on the offset value 1216). It should be noted that the asset may indicate information regarding the utility line type of the utility line 1232. For instance, image recognition and/or user input may be used to classify the utility line 1232 as being a "water" line. Patterns in the electromagnetic signals associated with the utility line 1232 may be used to identify, during future locating procedures, other water lines based on like electromagnetic signal patterns. For instance, Neural Network may use Deep Learning/artificial intelligence to recognize patterns and make predictions related to underground utilities including utility line type classification as illustrated in FIGS. 13, 14A, and 14B.

Figure 13:
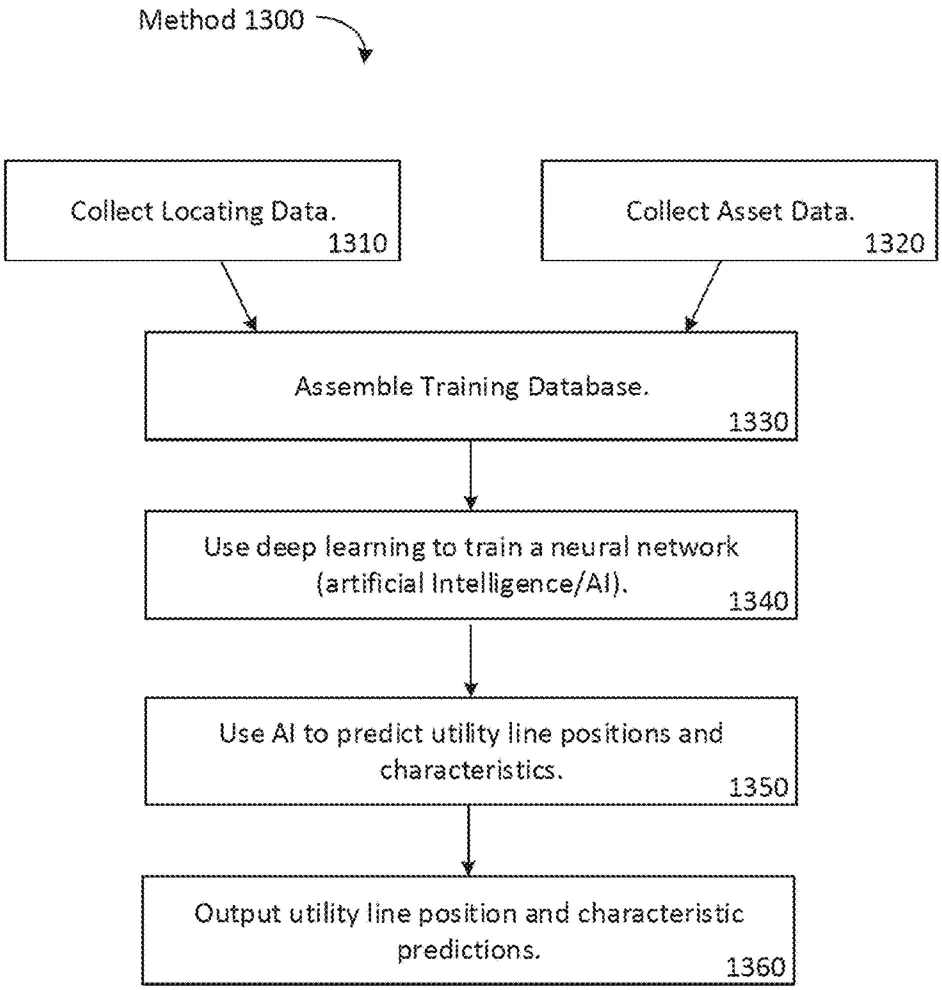
FIG. 13 is a method of providing Training Data the includes Locating Data and Asset Data to a Neural Network to use Deep Learning/artificial intelligence to recognize patterns and make predictions related to underground utilities including utility line type classification.

Turning to FIG. 13, a method 1300 is illustrated for providing Training Data to a Neural Network to use Deep Learning/artificial intelligence to recognize patterns and make predictions related to utility lines that includes utility line type classification. In a step 1310, the method 1300 may include collecting Locating Data. The Locating Data 1310 may be or include, but is not limited to, various sources illustrated with the Locating Data 1410 of FIG. 14A. In a step 1310 the method 1300 may include collecting Asset Data. The Asset Data 1320 may be or include, but is not limited to, various sources illustrated with the Asset Data 1420 of FIG. 14B. In a step 1330, the Locating Data 1310 and the Asset Data 1320 may be used in the assembly of the Training Data in a Training Database. In a step 1340, deep learning may utilize the Training Data of Training Database from the step 1330 to train a Neural Network (Artificial Intelligence/AI). In a step 1350, AI may be used to predict utility line positions and characteristics. For instance, AI may be used to predict utility line positions and map utility lines as well as utility line types (e.g., gas, water, sewer, power, telecommunications, and the like), and other characteristics. In a step 1360, the method 1300 may output utility line position and characteristic predictions. For instance, the predictions may be saved on one or more non-transitory memories, used to further locate utility lines, or the like.

Figure 14A:
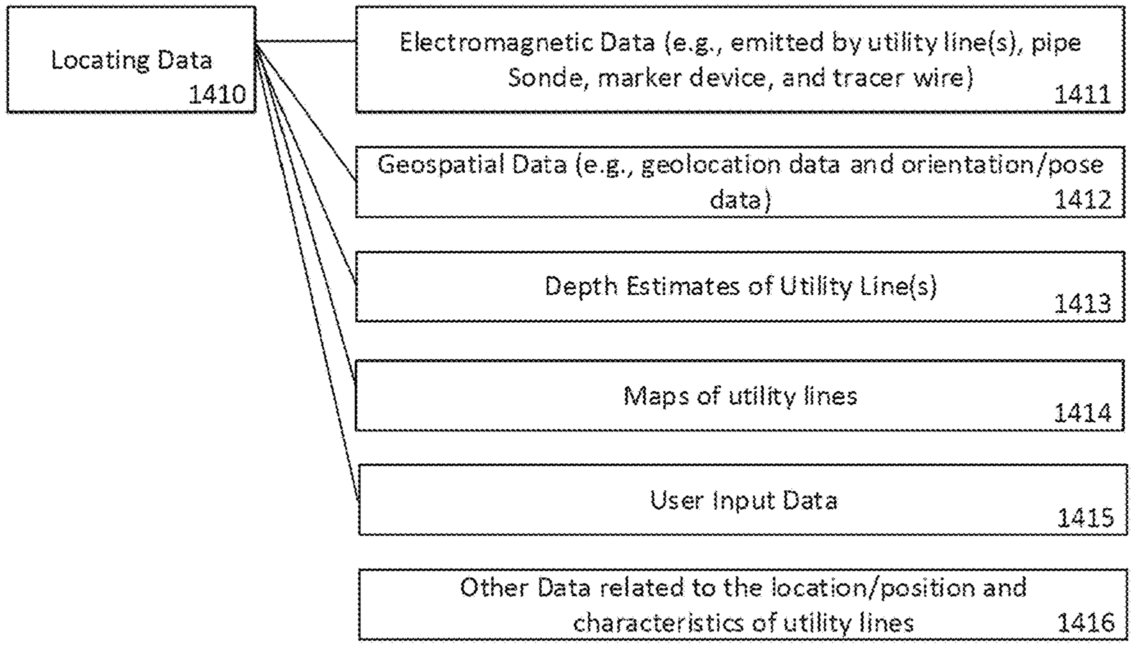
FIG. 14A is a diagram of example sources of Locating Data that may be used to train Neural Networks.

Turning to FIG. 14A, Locating Data 1410 is illustrated showing a plurality of example sources of data that may be used to train Neural Networks which may be the same or share aspects with the Locating Data of step 1310 of FIG. 13. As illustrated, the Locating Data 1410 may include, but should not be limited to, electromagnetic data (e.g., emitted by utility line(s), pipe Sonde, marker device, and tracer wire) 1411, geospatial data (e.g., location/position data and orientation/pose data) 1412, depth estimates of utility line(s) 1413 (e.g., depth of utility lines determined via the measured electromagnetic signals), maps of utility lines 1414, user input data 1415, and/or other data related to the location/position and characteristics of utility lines 1416.

Figure 14B:
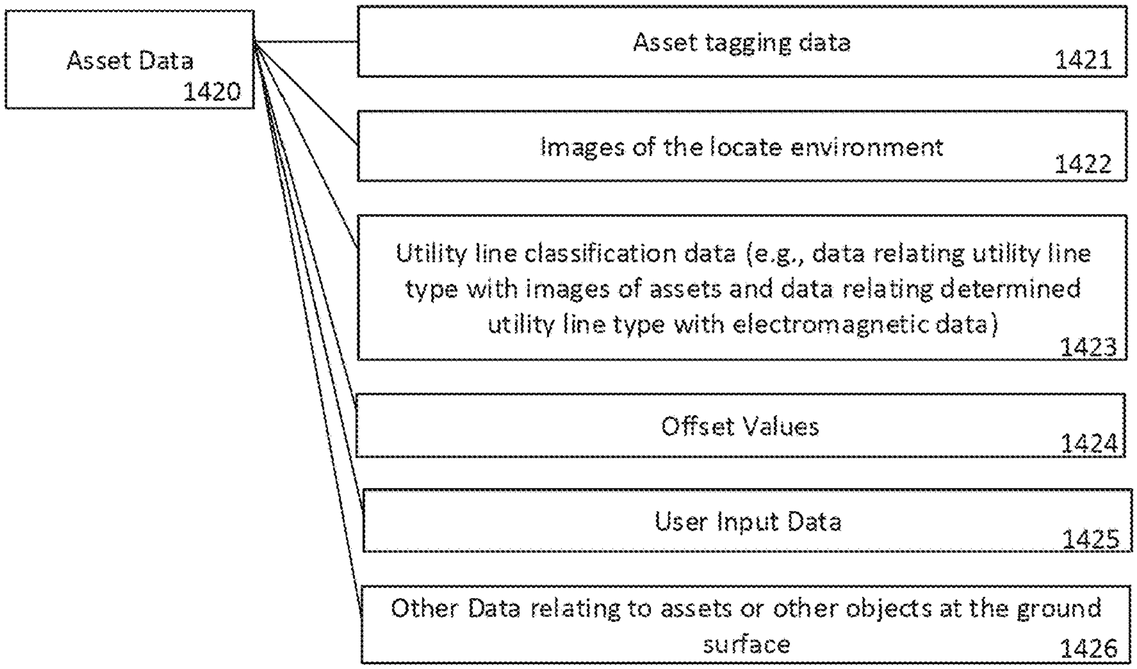
FIG. 14B is a diagram of example sources of Asset Data that may be used to train Neural Networks.

Turning to FIG. 14B, Asset Data 1420 is illustrated showing a plurality of example sources of data that may be used to train Neural Networks which may be the same or share aspects with the Asset Data of step 1320 of FIG. 13. As illustrated, the Asset Data 1420 may include, but should not be limited to, asset tagging data 1421, images of the locate environment 1422 (which may be orthorectified), utility line classification data (e.g., data relating utility line type with images of assets and data relating determined utility line type with electromagnetic data) 1423, offset values 1424, user input data 1425, and/or other identifiable characteristics of exposed utility lines 1426.

In some configurations, the apparatus or systems described herein may include means for implementing features or providing functions described herein. In one aspect, the aforementioned means may be a module including a processor or processors, associated memory and/or other electronics in which embodiments of the invention reside, such as to implement image and/or video signal processing, switching, transmission, or other functions to process and/or condition camera outputs, control lighting elements, control camera selection, or provide other electronic or optical functions described herein. These may be, for example, modules or apparatus residing in camera assemblies, camera and lighting assemblies, or other assemblies disposed on or within a push-cable or similar apparatus.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to tools, instruments, and other described devices may be implemented or performed in one or more processing elements using elements such as a general or special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Processing elements may include hardware and/or software/firmware to implement the functions described herein in various combinations.

The previous description of the disclosed embodiments is provided to enable any person skilled in the art to make or use various embodiments. Various modifications to these embodiments will be readily apparent to those skilled in the art, and the generic principles defined herein may be applied to other embodiments without departing from the spirit or scope of the disclosure.

Accordingly, the presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the scope of the present disclosure is not intended to be limited to the aspects shown herein but is to be accorded the widest scope consistent with the appended claims and their equivalents.

We claim:

1. A smartphone mounting apparatus for utility locator devices, comprising:

a retainer element to mount and selectively retain a smartphone such that the camera(s) of the smartphone remain unobstructed and approximately align with a median plane bisecting the utility locator device;

an angle orientation such that the smartphone in the retainer element is at a known angle where the camera(s) of the smartphone has a field of view to capture still and video images of an asset to be tagged at the ground surface in front of the utility locator device during normal usage; and a mounting element to secure the smartphone mounting apparatus to the utility locator device.

2. The smartphone mounting apparatus of claim 1, wherein the retainer element is adjustable to accommodate different sized and shaped smartphones.

3. The smartphone mounting apparatus of claim 1, wherein the mounting element couples to the mast of the utility locator device.

4. The smartphone mounting apparatus of claim 1, wherein the user interface of an attached smartphone is accessible by the user in control of the utility locator device.

5. The smartphone mounting apparatus of claim 1, further including a wired connector for connecting the smartphone and utility locator device for the purpose of exchanging data and/or providing electrical power to the smartphone.

6. The smartphone mounting apparatus of claim 1, further including a wireless charging mechanism for the purpose of providing electrical power to the smartphone.

7. The smartphone mounting apparatus of claim 1, further including a battery in providing electrical power to the smartphone.

8. The smartphone mounting apparatus of claim 1, wherein the camera or cameras include LiDAR or other three-dimensional imaging apparatus.

9. The smartphone mounting apparatus of claim 1, wherein the retainer element includes an opening positioned such that the camera of the smartphone remains unobstructed while the smartphone is retained by the retainer element.

10. The smartphone mounting apparatus of claim 1, wherein the retainer element includes a notch configured to provide access to a charging port of the smartphone while the smartphone is retained by the retainer element.

11. The smartphone mounting apparatus of claim 1, wherein the smartphone is retained such that a field of view of the camera is directed toward a ground surface located in front of the utility locator device during normal operation.

12. The smartphone mounting apparatus of claim 1, wherein the smartphone and the utility locator device are configured to communicate wirelessly with one another.

13. The smartphone mounting apparatus of claim 12, wherein the wireless communication comprises at least one of Bluetooth communication or Wi-Fi communication.

14. The smartphone mounting apparatus of claim 6, wherein the wireless charging mechanism is configured to provide electrical power from a battery of the utility locator device to the smartphone.

15. The smartphone mounting apparatus of claim 1, wherein the smartphone is retained at a known position and a known orientation relative to the utility locator device.

* * * * *